（12）United States Patent
Yamamoto

(10) Patent No.: US 10,591,637 B2
(45) Date of Patent: Mar. 17, 2020

(54) BALL ROTATIONAL DIRECTION DETECTING SYSTEM

(71) Applicant: AICHI STEEL CORPORATION, Tokai-shi (JP)

(72) Inventor: Michiharu Yamamoto, Aichi (JP)

(73) Assignee: AICHI STEEL CORPORATION, Tokai-shi (JP)

( * ) Notice: Subject to any disclaimer, the term of this patent is extended or adjusted under 35 U.S.C. 154(b) by 240 days.

(21) Appl. No.: 15/342,409

(22) Filed: Nov. 3, 2016

(65) Prior Publication Data

US 2017/0261644 A1 Sep. 14, 2017
US 2017/0363771 A9 Dec. 21, 2017

(30) Foreign Application Priority Data

Nov. 10, 2015 (JP) ................................. 2015-220502
Mar. 8, 2016 (JP) ................................. 2016-044558

(51) Int. Cl.
*G01V 15/00* (2006.01)
*G01P 15/08* (2006.01)
*G01P 15/18* (2013.01)

(52) U.S. Cl.
CPC .......... *G01V 15/00* (2013.01); *G01P 15/0891* (2013.01); *G01P 15/18* (2013.01)

(58) Field of Classification Search
CPC ................................ G01V 15/00; G01P 15/18
See application file for complete search history.

(56) References Cited

U.S. PATENT DOCUMENTS

| 6,151,563 | A | * | 11/2000 | Marinelli | ............... | A63B 43/00 |
| | | | | | | 473/569 |
| 7,487,045 | B1 | * | 2/2009 | Vieira | ................ | A63B 24/0021 |
| | | | | | | 702/181 |
| 7,640,135 | B2 | * | 12/2009 | Vock | ....................... | G01C 9/00 |
| | | | | | | 342/104 |
| 2009/0325739 | A1 | * | 12/2009 | Gold | ...................... | A63B 43/00 |
| | | | | | | 473/570 |

(Continued)

FOREIGN PATENT DOCUMENTS

| JP | 11-211474 A | 8/1999 |
| JP | 11-211479 A | 8/1999 |

(Continued)

OTHER PUBLICATIONS

Japanese Office Action dated Jan. 9, 2018 in Patent Application No. 2016-044558 (with English translation, downloaded from the Global Dossier on the EPO website), 4 pages.

*Primary Examiner* — Stephanie E Bloss
(74) *Attorney, Agent, or Firm* — Oblon, McClelland, Maier & Neustadt, L.L.P.

(57) ABSTRACT

A ball rotational direction detecting system includes a magnetic sensor that is fixed in a ball, an acceleration sensor, a bearing recording unit that records a moving bearing, a magnetic dip recording unit that records a magnetic dip α of geomagnetism, and a calculating unit. The calculating unit calculates the orientation of the rotation axis and the rotational direction of the ball with respect to a traveling direction F and a gravity direction G of the ball, based on a geomagnetism vector m, an acceleration vector a, the moving bearing, the magnetic dip α, and time variations in the geomagnetism vector m or the acceleration vector a.

17 Claims, 16 Drawing Sheets

(56) References Cited

U.S. PATENT DOCUMENTS

| | | | | |
|---|---|---|---|---|
| 2011/0118065 A1* | 5/2011 | Krysiak | ............... | A63B 41/02 |
| | | | | 473/603 |
| 2012/0151786 A1* | 6/2012 | Ohmori | ............... | G01C 17/30 |
| | | | | 33/361 |
| 2013/0073247 A1* | 3/2013 | Perkins | ............... | G01C 21/16 |
| | | | | 702/141 |
| 2013/0274040 A1* | 10/2013 | Coza | ............... | G09B 19/0038 |
| | | | | 473/570 |
| 2013/0342197 A1 | 12/2013 | Uchiyama et al. | | |
| 2014/0045630 A1* | 2/2014 | Perkins | ............... | A63B 69/00 |
| | | | | 473/570 |
| 2015/0204647 A1* | 7/2015 | Yi | ............... | H01L 43/14 |
| | | | | 324/207.17 |
| 2016/0121164 A1 | 5/2016 | Coza et al. | | |

FOREIGN PATENT DOCUMENTS

| | | |
|---|---|---|
| JP | 2006-337333 A | 12/2006 |
| JP | 2012-185103 A | 9/2012 |
| JP | 2013-221942 A | 10/2013 |
| JP | 2014-160025 | 9/2014 |

\* cited by examiner

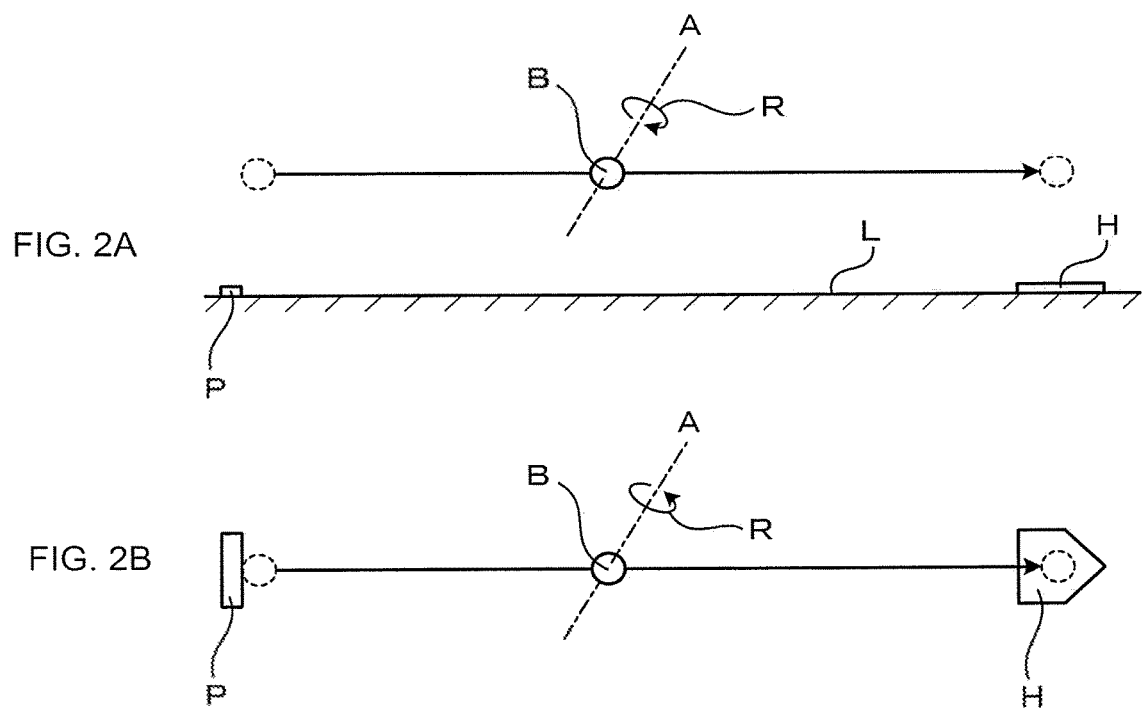
FIG. 2A
FIG. 2B
FIG. 3
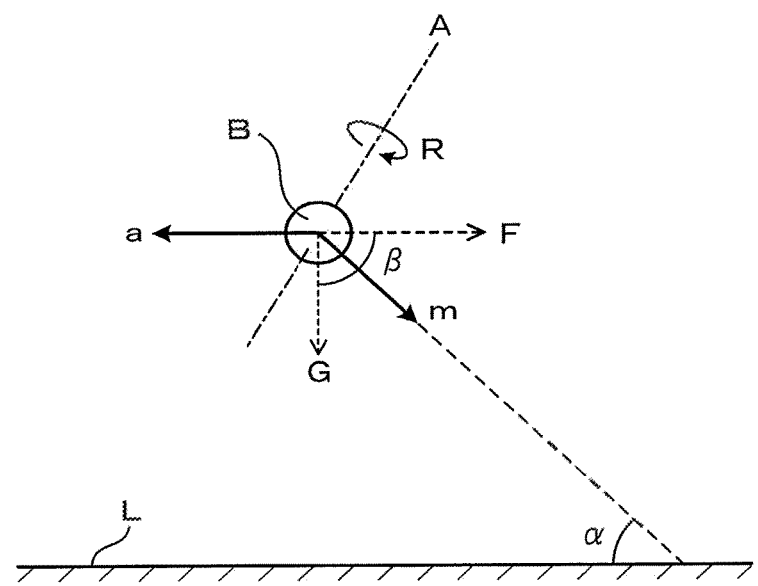

BALL ROTATIONAL DIRECTION DETECTING SYSTEM

CROSS-REFERENCE TO RELATED APPLICATION

The present application claims priority under 35 U.S.C. § 119 to Japanese Application No. 2016-044558, filed on Mar. 8, 2016, entitled "BALL ROTATIONAL DIRECTION DETECTING SYSTEM." The contents of this application are incorporated herein by reference in their entirety.

BACKGROUND OF THE INVENTION

Field of the Invention

The present invention relates to a ball rotational direction detecting system that detects the orientation of the rotation axis and the rotational direction of a ball moving in midair with respect to the traveling direction and the gravity direction of the ball.

Description of the Related Art

For example, JP-A-2014-160025 discloses a rotational speed detecting device that detects the rotational speed of a ball moving in midair such as a ball thrown by a baseball pitcher. This rotational speed detecting device is configured so as to be able to calculate the rotational speed of the ball moving in midair based on time variations in the output of a magnetic sensor provided in the ball. With this rotational speed detecting device, it is possible to detect the rotational speed of a ball without using a large-scale apparatus.

PATENT DOCUMENTS

Patent Document 1: JP-A-2014-160025

SUMMARY OF THE INVENTION

However, there is a case where what is demanded is not only to detect the rotational speed of a ball but also to detect the orientation of the rotation axis and the rotational direction of the ball. For example, to determine the type of pitch made by a baseball pitcher, information on the orientation of the rotation axis and the rotational direction of a ball with respect to the traveling direction and the gravity direction of the ball is useful. That is, the type of pitch made by the pitcher is normally estimated from the locus or the like of the ball, but can also be estimated from how the ball rotates. Information required here on how the ball rotates includes the orientation of the rotation axis and the rotational direction of the ball with respect to the traveling direction and the gravity direction of the ball. For example, in the case of a curveball or a slider thrown by a right-handed pitcher, the rotation axis of the ball roughly points in a gravity direction, and the rotational direction of the ball is counterclockwise when seen from above. In the case of a fastball, the rotation axis of the ball is roughly orthogonal to both the traveling direction and the gravity direction of the ball, and the rotational direction of the ball is a reverse rotation (backspin). As seen above, to estimate the type of pitch of a pitcher from how a ball rotates, the information on the orientation of the rotation axis and the rotational direction of the ball with respect to the traveling direction and the gravity direction of the ball is required.

Not only to determine the type of pitch made by a pitcher but also to evaluate the quality of a fastball or a breaking ball, the information on the orientation of the rotation axis and the rotational direction of a ball with respect to the traveling direction and the gravity direction of the ball is useful. That is, by grasping the orientation of the rotation axis of a ball, it is conceivable to help the improvement of the way of pitching of a pitcher such as a pitching form and a grip of a ball.

Not only in baseball, but also in the other ball games including tennis, softball, golf, table tennis, volleyball, and soccer, it is conceivable to use information on the orientation of the rotation axis and the rotational direction of a ball to evaluate the type of pitch, the quality of pitch, and the like.

As seen above, in various ball games including baseball, there is a demand to evaluate the type of pitch, the quality of pitch, and the like by measuring how a ball rotates. In such a case, although it is possible to measure how a ball rotates based on images captured by a high-speed camera or the like, there is still a problem in that such measurement makes an apparatus large-scale.

The present invention is made in view of such problems, providing a ball rotational direction detecting system that detects, with a simple configuration, the orientation of the rotation axis and the rotational direction of a ball moving in midair, with respect to the traveling direction and the gravity direction of the ball.

One aspect of the present invention is a ball rotational direction detecting system that detects the orientation of the rotation axis and the rotational direction of a ball moving in midair with respect to the traveling direction and the gravity direction of the ball, the ball rotational direction detecting system including:

a magnetic sensor that detects a geomagnetism vector in a ball coordinate system, which is a three-axis orthogonal coordinate system fixed in the ball;

an acceleration sensor that detects an acceleration vector in the ball coordinate system;

a bearing recording unit that records a moving bearing, the moving bearing being a bearing in which the ball moves;

a magnetic dip recording unit that records the magnetic dip of geomagnetism; and a calculating unit that calculates the orientation of the rotation axis and the rotational direction of the ball with respect to the traveling direction and the gravity direction based on the geomagnetism vector, the acceleration vector, the moving bearing, the magnetic dip, and a time variation in the geomagnetism vector or the acceleration vector.

The ball rotational direction detecting system includes the magnetic sensor and the acceleration sensor that are fixed in the ball, as well as the bearing recording unit, the magnetic dip recording unit, and the calculating unit. This configuration enables, as will be described, the calculation of the traveling direction and the gravity direction in the ball coordinate system, and the rotation axis and the rotational direction of the earth coordinate system in the ball coordinate system, using the geomagnetism vector and the acceleration vector. As a result, in the rotational direction calculating unit, it is possible to calculate the orientation of the rotation axis and the rotational direction of the ball with respect to the traveling direction and the gravity direction.

As seen above, according to the ball rotational direction detecting system, by using the geomagnetism vector and the acceleration vector together with the magnetic dip and the moving bearing, it is possible to detect the orientation of the rotation axis and the rotational direction of the ball with respect to the traveling direction and the gravity direction. It is therefore possible to detect the orientation of the rotation axis and the rotational direction of the ball moving in midair with respect to the traveling direction and the gravity direction of the ball, with a simple configuration.

As described above, according to the aspect, it is possible to provide a ball rotational direction detecting system that detects the orientation of the rotation axis and the rotational direction of a ball moving in midair with respect to the traveling direction and the gravity direction of the ball.

BRIEF DESCRIPTION OF THE DRAWINGS

FIG. 2A is a schematic side view illustrating midair movement of a ball in Embodiment 1;

FIG. 2B is a schematic plan view illustrating the midair movement of the ball in Embodiment 1;

FIG. 3 is a schematic diagram of an acceleration vector and a geomagnetism vector acting on the ball in the midair movement in Embodiment 1;

DESCRIPTION OF THE PREFERRED EMBODIMENTS

Figure 1:
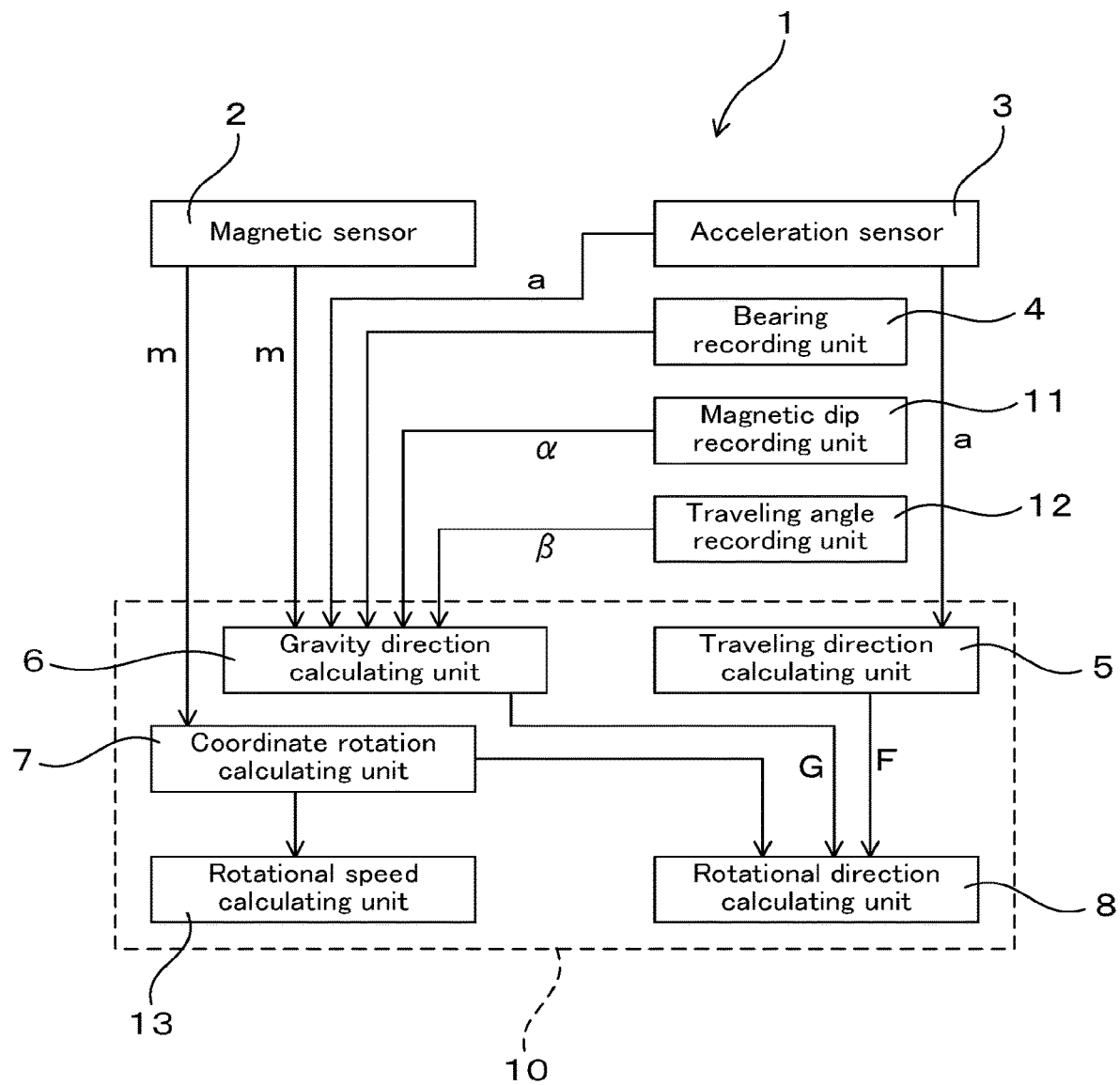
FIG. 1 is a conceptual diagram of a ball rotational direction detecting system in Embodiment 1.

As to a ball being a detection object for the ball rotational direction detecting system, a traveling direction in midair movement of the ball is a direction different from a gravity direction. The traveling direction can be, for example, a substantially horizontal direction. In addition, the traveling direction may be oblique to the horizontal direction.

The calculating unit can include:
a traveling direction calculating unit that calculates the traveling direction in the ball coordinate system based on the acceleration vector detected by the acceleration sensor;
a gravity direction calculating unit that calculates the gravity direction in the ball coordinate system based on the geomagnetism vector detected by the magnetic sensor, the acceleration vector detected by the acceleration sensor, the moving bearing recorded in the bearing recording unit, and the magnetic dip recorded in the magnetic dip recording unit;
a coordinate rotation calculating unit that calculates a rotation axis and a rotational direction of an earth coordinate system in the ball coordinate system based on a time variation in the geomagnetism vector detected by the magnetic sensor or a time variation in the acceleration vector detected by the acceleration sensor; and
a rotational direction calculating unit that calculates the orientation of the rotation axis and the rotational direction of the ball with respect to the traveling direction and the gravity direction based on the traveling direction in the ball coordinate system calculated by the traveling direction calculating unit, the gravity direction in the ball coordinate system calculated by the gravity direction calculating unit, and the rotation axis and the rotational direction of the earth coordinate system in the ball coordinate system calculated by the coordinate rotation calculating unit.

In this case, as will be described, it is possible to detect the orientation of the rotation axis and the rotational direction with respect to the traveling direction and the gravity direction, easily and accurately.

It is preferable that the ball rotational direction detecting system further includes a traveling angle recording unit that records a traveling angle $\beta$, the traveling angle $\beta$ being an angle formed by the traveling direction and the gravity direction of the ball, wherein assuming that, with the magnetic dip denoted by $\alpha$, an angle formed by the geomagnetism vector and the gravity direction is $90°-\alpha$, and an angle formed by the acceleration vector and the gravity direction is $180°-\beta$, the gravity direction calculating unit calculates the gravity direction in the ball coordinate system, based on the geomagnetism vector detected by the magnetic sensor, the acceleration vector detected by the acceleration sensor, the magnetic dip, the traveling angle $\beta$, and the moving bearing.

In this case, the magnetic dip $\alpha$ and the traveling angle $\beta$ in accordance with a measurement location and the locus of the ball being a measurement object can be input as appropriate. It is therefore possible to obtain a ball rotational direction detecting system that has an increased versatility and facilitates more accurate measurement.

It is preferable that the ball rotational direction detecting system further includes a bearing calculating unit that calculates the moving bearing based on the geomagnetism vector detected by the magnetic sensor, in the state where the ball includes on a surface of the ball a first specific region and a second specific region pointing in directions orthogonal to each other, and the ball is brought to a standstill with the first specific region and the second specific region pointing in the moving bearing and a vertically upward direction, respectively, wherein the moving bearing calculated by the bearing calculating unit is recorded in the bearing recording unit.

In this case, it is possible to detect the moving bearing using the magnetic sensor fixed in the ball. This is therefore useful in the case where measurement is performed in a situation where the moving bearing (a bearing in which a pitch is intended to be made) is not grasped in advance. In addition, this facilitates the input of the moving bearing to the ball rotational direction detecting system.

It is preferable that the ball rotational direction detecting system further includes a magnetic dip calculating unit that calculates the magnetic dip based on the acceleration vector detected by the acceleration sensor and the geomagnetism vector detected by the magnetic sensor, in the state where the ball is brought to a standstill, wherein the magnetic dip calculated by the magnetic dip calculating unit is recorded in the magnetic dip recording unit.

In this case, it is possible to detect the magnetic dip α of geomagnetism at a measurement location using the magnetic sensor and the acceleration sensor fixed in the ball B. This is therefore useful, for example, in the case where measurement is performed in a location where a magnetic dip α is not grasped in advance. In addition, this facilitates the input of the magnetic dip α to the ball rotational direction detecting system.

It is preferable that the coordinate rotation calculating unit further calculates the rotational speed of the earth coordinate system in the ball coordinate system based on time variations in the geomagnetism vector detected by the magnetic sensor, and the ball rotational direction detecting system further includes a rotational speed calculating unit that calculates the rotational speed of the ball based on the rotational speed of the earth coordinate system in the ball coordinate system calculated by the coordinate rotation calculating unit.

In this case, in addition to the orientation of the rotation axis and the rotational direction of the ball, the rotational speed can be measured. For this reason, for example, it is possible to determine the type of pitch or to evaluate the quality of pitch, with higher precision.

It is preferable that the ball rotational direction detecting system further including: an impact acceleration sensor that is fixed in the ball and detects an impact acceleration at least in one axis direction, the impact acceleration having a magnitude greater than the magnitude of the acceleration vector detected by the acceleration sensor; and an end determining unit that determines, based on the acceleration detected by the impact acceleration sensor, a time point at which midair movement of the ball ends.

In this case, it is possible to determine a time point at which the midair movement of the ball ends, which can omit the measurement of the rotation axis and the rotational direction after the end of the midair movement. This enables the suppression of the capacity of a memory that is necessary to store measurement results.

It is preferable that the impact acceleration sensor has a lower detection sensitivity than the acceleration sensor and has a wider detection range than the acceleration sensor. In this case, it is possible to detect both air drag acting on the ball in midair movement and an impact that the ball receives at a time point at which the midair movement ends, appropriately.

It is preferable that the impact acceleration sensor measures the impact acceleration in three axis directions orthogonal to one another. In this case, it is possible to detect the impact that the ball receives at the time point at which the midair movement ends, reliably.

It is preferable that the ball rotational direction detecting system further includes a start determining unit that determines, based on the acceleration detected by the impact acceleration sensor, a time point at which the midair movement of the ball starts. In this case, it is possible to determine a time point at which the midair movement of the ball starts, and thus it is not necessary to leave data measured before the midair movement in a memory. This enables the suppression of the capacity of the memory.

It is possible to configure the ball rotational direction detecting system to detect using the acceleration sensor an acceleration vector at the time when the ball having been thrown is caught, as a catching-time acceleration vector, and to calculate the traveling direction in the ball coordinate system based on the catching-time acceleration vector. In this case, using the acceleration vector detected upon an impact at the catching time point, it is possible to calculate the traveling direction of the ball. For this reason, it is not necessary to use a sensor having a particularly high detection sensitivity as the acceleration sensor. As a result, it is possible to detect the traveling direction easily and accurately.

It is preferable that the magnetic sensor is constituted by a magneto-impedance sensor. In this case, it is possible to measure the orientation of the rotation axis and the rotational direction of the ball, more accurately. That is, magneto-impedance sensors (hereafter, also referred to as MI sensors) are excellent in detection sensitivity and responsivity, and thus it is possible to detect geomagnetism accurately as well as to make measurement intervals extremely short. For this reason, even when a ball rotates at high speed, it is possible to measure the orientation of the rotation axis and the rotational direction of the ball with respect to the traveling direction and the gravity direction, accurately.

(Embodiment 1)

An embodiment of a ball rotational direction detecting system will be described with reference to FIG. 1 to FIG. 7.

A ball rotational direction detecting system 1 according to the present embodiment is a system that detects, as illustrated in FIG. 2A, FIG. 2B and FIG. 3, the orientation of a rotation axis A and rotational direction R of a ball B moving in midair, with respect to a traveling direction F of the ball B and a gravity direction G.

As illustrated in FIG. 1, the ball rotational direction detecting system 1 includes a magnetic sensor 2, an acceleration sensor 3, a bearing recording unit 4, a magnetic dip recording unit 11, and a calculating unit 10.

Figure 4:
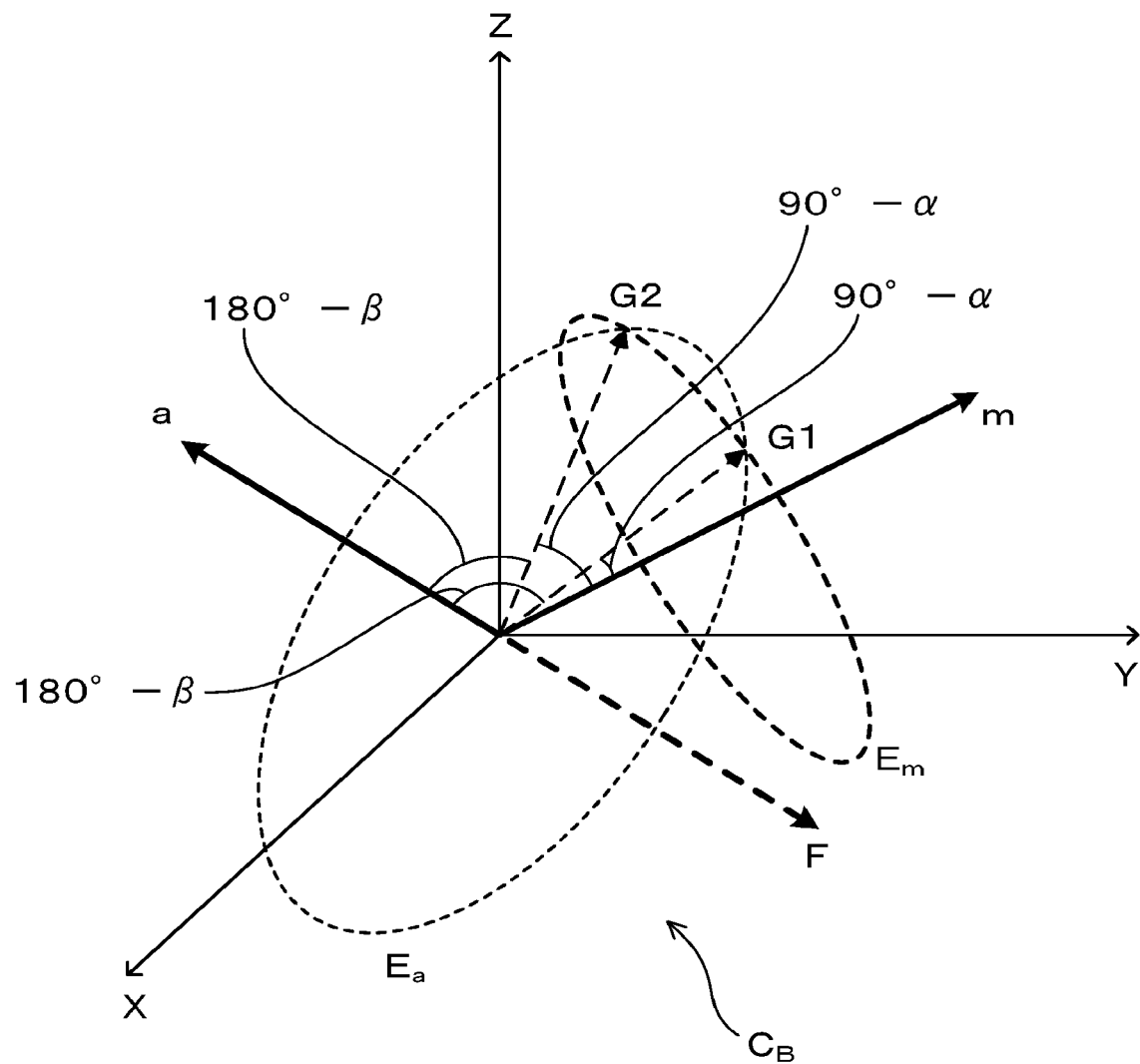
FIG. 4 is a schematic diagram of the acceleration vector and the geomagnetism vector in a ball coordinate system in Embodiment 1.

As illustrated in FIG. 4, the magnetic sensor 2 detects a geomagnetism vector m in a ball coordinate system $C_B$, which is a three-axis orthogonal coordinate system fixed in the ball B. The acceleration sensor 3 detects an acceleration vector a in the ball coordinate system $C_B$.

The bearing recording unit 4 records a moving bearing, in which the ball B moves. The term "bearing" used herein means compass bearings.

The magnetic dip recording unit 11 records the magnetic dip of geomagnetism at a measurement site.

The calculating unit 10 calculates the orientation of the rotation axis A and the rotational direction R of the ball B with respect to the traveling direction F and the gravity direction G, based on the geomagnetism vector m, the acceleration vector a, the moving bearing, the magnetic dip, and time variations in the geomagnetism vector m or the acceleration vector a.

As illustrated in FIG. 1, the calculating unit 10 includes a traveling direction calculating unit 5, a gravity direction calculating unit 6, a coordinate rotation calculating unit 7, and a rotational direction calculating unit 8.

The traveling direction calculating unit 5 calculates the traveling direction F in the ball coordinate system $C_B$ based on the acceleration vector a detected by the acceleration sensor 3.

The gravity direction calculating unit 6 calculates the gravity direction G in the ball coordinate system $C_B$ based on the geomagnetism vector m detected by the magnetic sensor 2 during the midair movement of the ball B, the acceleration vector a detected by the acceleration sensor 3 during the midair movement of the ball B, and the moving bearing recorded in the bearing recording unit 4.

Figure 6:
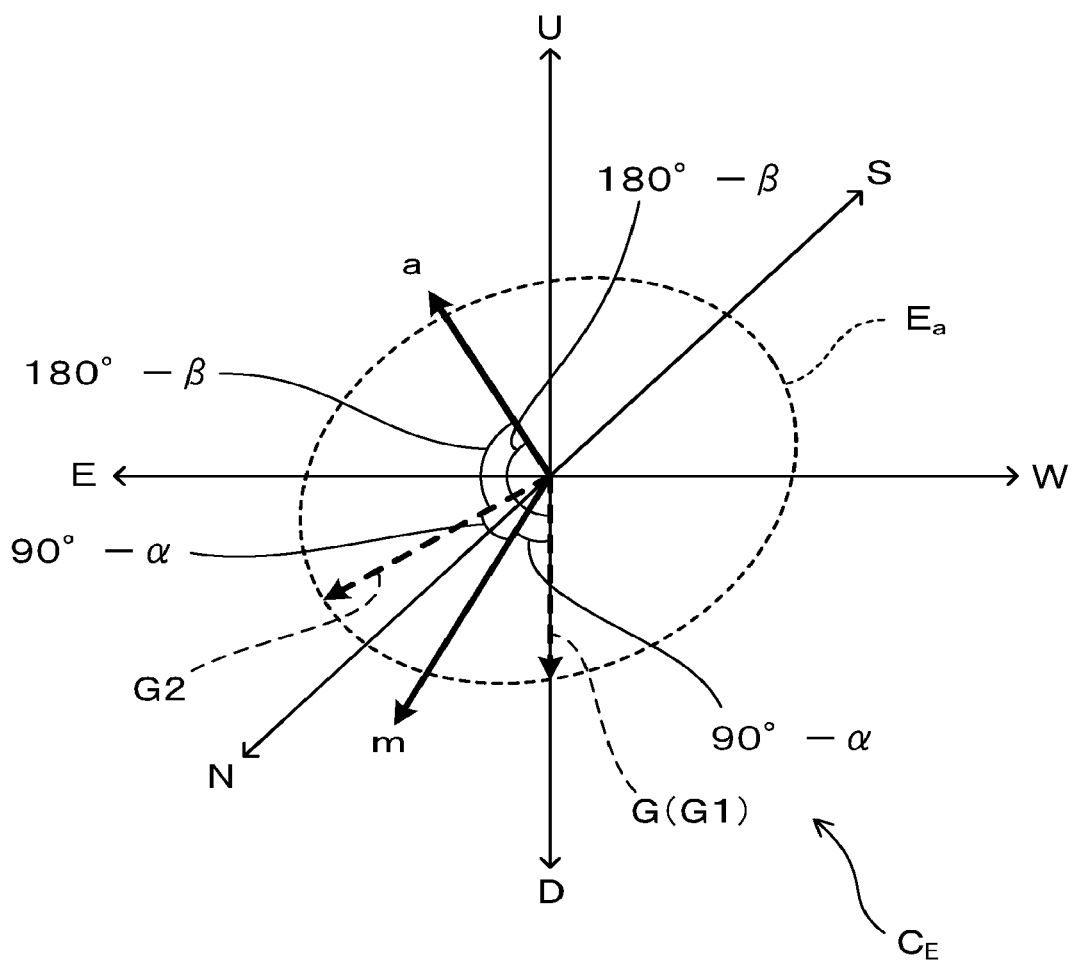
FIG. 6 is a schematic diagram of the acceleration vector and the geomagnetism vector in an earth coordinate system in Embodiment 1.

The coordinate rotation calculating unit 7 calculates the rotation axis and the rotational direction of an earth coordinate system $C_E$ (FIG. 6) in the ball coordinate system $C_B$ (FIG. 4) based on the time variations in the geomagnetism vector m detected by the magnetic sensor 2 during the midair movement of the ball B. The earth coordinate system $C_E$ is a three-axis orthogonal coordinate system fixed in the Earth, including three coordinate axes orthogonal to one another in a north-south bearing, an east-west bearing, and a vertical direction. In FIG. 6, S denotes southward, N denotes northward, E denotes eastward, W denotes westward, U denotes upward, and D denotes downward.

The rotational direction calculating unit 8 calculates the orientation of the rotation axis A and the rotational direction R of the ball B with respect to the traveling direction F and the gravity direction G based on the traveling direction F in the ball coordinate system $C_B$ calculated by the traveling direction calculating unit 5, the gravity direction in the ball coordinate system $C_B$ calculated by the gravity direction calculating unit 6, and the rotation axis and the rotational direction of the earth coordinate system $C_E$ in the ball coordinate system $C_B$ calculated by the coordinate rotation calculating unit 7.

The magnetic sensor 2 and the acceleration sensor 3 are both fixed in the ball B. The magnetic sensor 2 detects geomagnetism in three axis directions orthogonal to one another (an X-axis direction, a Y-axis direction, and a Z-axis direction in FIG. 4 and FIG. 5), respectively. The acceleration sensor 3 detects acceleration in the three axis directions orthogonal to one another. It is thereby possible to measure the geomagnetism vector m and the acceleration vector a in the ball coordinate system $C_B$, being the three-axis orthogonal coordinate system fixed in the ball B. The acceleration sensor 3 is embedded in the vicinity of the center of gravity of the ball B.

As illustrated in FIG. 2A and FIG. 2B, the ball rotational direction detecting system 1 of the present embodiment detects the orientation of the rotation axis A and the rotational direction R of the ball B in the case where a baseball pitcher throws a ball B from a pitcher's plate P toward a home plate H (catcher). In FIG. 2A, FIG. 2B, and FIG. 3, reference character L denotes the ground that is horizontal.

When the pitcher throws the ball B, the ball B moves in midair while rotating. At this point, the ball B moves roughly in a horizontal direction. On this ball B in the midair movement, air drag is to act in a direction opposite to a traveling direction F. This air drag is detected by the acceleration sensor 3 built in the ball B, in the form of an acceleration. That is, as illustrated in FIG. 3, a vector in a reverse direction to the traveling direction F of the ball B can be detected as the acceleration vector a in the ball coordinate system $C_B$.

The traveling direction calculating unit 5 can calculate the traveling direction F of the ball B based on the acceleration vector a acting on the ball B. Specifically, a direction reverse to the direction of the acceleration vector a can be calculated as the traveling direction F. The acceleration vector a can be detected consecutively during the midair movement of the ball B, for example, detected at a frequency of 250 times/ second or higher. That is, a measurement interval is set to 4 milliseconds or shorter.

Under normal circumstances, the ball B rotates during midair movement, and thus the ball coordinate system $C_B$ itself rotates with respect to the earth coordinate system $C_E$. Meanwhile, the traveling direction F of the ball B is roughly constant and scarcely changes over time. Actually, the traveling direction F of the ball B is not completely constant (e.g., the ball B flies in a parabola), but can be considered to be substantially constant when compared with changes in the orientation (posture) of the ball B due to the rotation of the ball B. As seen above, with respect to the earth coordinate system $C_E$, the traveling direction F is substantially constant, and the ball coordinate system $C_B$ rotates.

For this reason, the traveling direction F in the ball coordinate system $C_B$, namely the traveling direction F in the ball coordinate system $C_B$ consecutively changes, and the direction of the acceleration vector a in the ball coordinate system $C_B$, namely the direction of the acceleration vector a in the ball coordinate system $C_B$ consecutively changes. However, it is true at each instant that the reverse direction to the acceleration vector a is the traveling direction F, and thus the reverse direction to the acceleration vector a at each instant can be calculated as the traveling direction F of the ball B at the instant. In such a manner, at each instant in midair movement of the ball B, it is possible to calculate the traveling direction F of the ball B in the ball coordinate system $C_B$.

Now, the ball B is in free fall, and thus the acceleration sensor 3 build in the ball B cannot detect a gravitational acceleration directly. For this reason, the gravity direction G cannot be detected by using only the acceleration sensor 3. Thus, in order for the gravity direction calculating unit 6 to calculate the gravity direction G in the ball coordinate system $C_B$, the geomagnetism vector m in the ball coordinate system $C_B$ detected by the magnetic sensor 2 is also used, as illustrated in FIG. 4.

Here, besides the acceleration vector a and the geomagnetism vector m, the present embodiment uses a magnetic dip α of geomagnetism and an angle that is formed by the traveling direction F of the ball B and the gravity direction G (a traveling angle β), as pieces of information used for the calculation of the gravity direction G.

As illustrated in FIG. 3, an angle formed by the geomagnetism vector m and the gravity direction G can be grasped in advance accurately. That is, as to the geomagnetism, each location on the Earth gives a predetermined magnetic dip α, which is determined, for example, to be about 49° in the Kanto region of Japan. While different latitudes yield different magnetic dips α, a magnetic dip at each location at a latitude is also grasped. Therefore, to perform the calculation more accurately, a magnetic dip corresponding to the each location may be used. As seen above, since a magnetic dip at a measurement site is determined as a certain value, the angle formed by the gravity direction G and the geomagnetism vector m is grasped as a certain value from a magnetic dip α.

In addition, as previously described, the traveling direction F of the ball B is known as a substantially horizontal direction. Therefore, the traveling angle β, which is the angle formed by the traveling direction F of the ball B and the gravity direction G, is known as the substantially right angle. Here, if the traveling angle β is not 90° but an angle other than the right angle, for example, 85°, the traveling angle β can be grasped in advance.

As illustrated in FIG. 1, the ball rotational direction detecting system 1 includes the magnetic dip recording unit 11 that records the magnetic dip α of geomagnetism, and the traveling angle recording unit 12 that records the traveling angle β being the angle formed by the traveling direction F of the ball B and the gravity direction G. In addition, the gravity direction calculating unit 6 calculates the gravity direction G in the ball coordinate system $C_B$ based on the geomagnetism vector m detected by the magnetic sensor 2, the acceleration vector a detected by the acceleration sensor 3, the magnetic dip α, the traveling angle β, and the moving bearing. Here, the gravity direction calculating unit 6 performs the calculation assuming that, as illustrated in FIG. 3, the angle formed by the geomagnetism vector m and the gravity direction G is 90°−α, and the angle formed by the acceleration vector a and the gravity direction G is 180°−β.

That is, in the ball coordinate system $C_B$, the direction of a vector that forms an angle of 90°−α with the geomagnetism vector m and forms an angle of 180°−β with the acceleration vector a is calculated as the gravity direction G. However, as illustrated in FIG. 4, there are normally two vectors that form an angle of 90°−α with the geomagnetism vector m and form an angle of 180°−β with the acceleration vector a.

In FIG. 4, a circle $E_a$ illustrated by a broken line is equivalent to the locus of the end point of every unit vector that forms an angle of 180°−β with the acceleration vector a. A circle $E_m$ illustrated by a broken line is equivalent to the locus of the end point of every unit vector that forms an angle of 90°−α with the geomagnetism vector m. Intersections of these two locus circles $E_a$ and $E_m$ are the end points of vectors that form an angle of 90°−α with the geomagnetism vector m and form an angle of 180°−β with the acceleration vector a, and the number of the intersections is normally two. These two vectors will be hereafter referred to as vectors G1 and G2, as appropriate.

It is noted that, in the case where the moving bearing of the ball B is parallel to the north-south bearing, the vectors G1 and G2 coincide with each other. Strictly speaking with the magnetic declination of geomagnetism taken into consideration, when the horizontal direction component of the geomagnetism vector m is parallel to the horizontal direction component of the traveling direction F of the ball B, the vectors G1 and G2 coincide with each other to be set to a vector. Then, although there are two vectors G1 and G2, when the horizontal direction component of the geomagnetism vector m is roughly parallel to the horizontal direction component of the traveling direction F of the ball B, namely when the moving bearing of the ball B is roughly parallel to the north-south bearing, the directions of the vectors G1 and G2 are roughly the same.

However, when the moving bearing of the ball B deviates from the north-south bearing, two different vectors G1 and G2 exist, and thus one of them needs to be calculated as the gravity direction G. To select one of these two vectors G1 and G2, the moving bearing recorded in the bearing recording unit 4 is used. That is, when the moving bearing deviates from the north-south bearing, one of two solutions (the vectors G1 and G2) is selected as the vector in the gravity direction G based on the moving bearing. Specifically, for example, when the moving bearing is westward (the bearing of the acceleration vector a is eastward), one of the vectors G1 and G2 that is closer to a vector being the vector product of the acceleration vector a and the magnetic vector m (m×a) is selected as the vector in the gravity direction G. On the other hand, when the moving bearing is eastward (the bearing of the acceleration vector a is westward), one of the vectors G1 and G2 that is closer to a vector being the vector product of the magnetic vector m and the acceleration vector a (a×m) is selected as the vector in the gravity direction G.

In contrast, when the moving bearing is substantially in the north-south bearing (i.e., substantially southward or northward), the vectors G1 and G2 coincide with each other as previously described, or even if there are two solutions (the vectors G1 and G2), there is no significant difference between the two solutions. For this reason, either of the solutions may be selected as the vector in the gravity direction G.

In the present embodiment, in the case where the moving bearing deviates from the north-south bearing, the determination as to whether the moving bearing is eastward or westward suffices, and an accurate bearing is not always needed. However, when the moving bearing is determined to substantially coincide with the north-south bearing, the accuracy of the moving bearing in proportion to a required accuracy is demanded.

In the above-described manner, at each instant during the midair movement of the ball B, the traveling direction F and the gravity direction G in the ball coordinate system $C_B$ can be calculated.

Therefore, at each instant during the midair movement of the ball B, when the rotation axis and the rotational direction of the earth coordinate system $C_E$ in the ball coordinate system $C_B$ are obtained, it is possible to obtain, via the ball coordinate system $C_B$, the orientation of the rotation axis A and the rotational direction R of the ball B with respect to traveling direction F, as well as the orientation of the rotation axis A and the rotational direction R of the ball B with respect to the gravity direction G.

Figure 5:
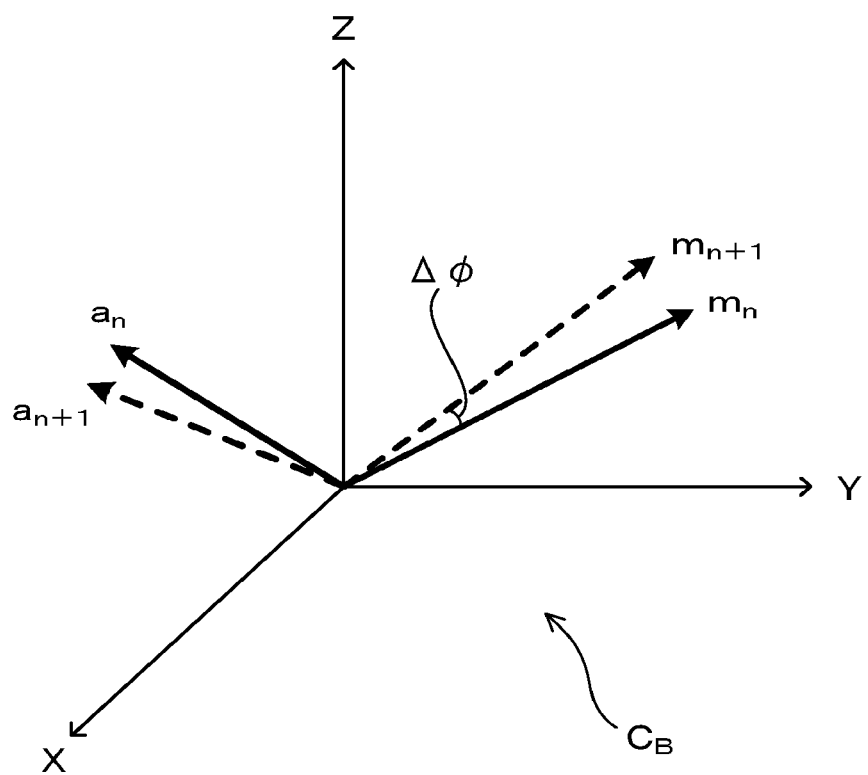
FIG. 5 is a schematic diagram of time variations in the acceleration vector and the geomagnetism vector in the ball coordinate system in Embodiment 1.

Thus, the coordinate rotation calculating unit 7 calculates the rotation axis and the rotational direction of the earth coordinate system $C_E$ in the ball coordinate system $C_B$ based on the time variations in the geomagnetism vector m detected by the magnetic sensor 2. That is, since the geomagnetism vector m is fixed in the earth coordinate system $C_E$, the rotation axis and the rotational direction of the earth coordinate system $C_E$ in the ball coordinate system $C_B$ can be calculated from the time variations in the geomagnetism vector m in the ball coordinate system $C_B$. Specifically, the rotation axis and the rotational direction of the earth coordinate system $C_E$ in the ball coordinate system $C_B$ can be calculated based on, for example, time variations in the geomagnetism vector m in the ball coordinate system $C_B$ consecutively acquired at time intervals of 4 ms or shorter. That is, as illustrated in FIG. 5, the direction of a change in orientation between a geomagnetism vector $m_n$ and a geomagnetism vector $m_{n+1}$ at a time point $t_n$ and a time point $t_{n+1}$, respectively, is the rotational direction of the earth coordinate system $C_E$ in the ball coordinate system $C_B$, and the axis of the rotational direction is the rotation axis A.

In addition, the angle formed by the two geomagnetism vectors $m_n$ and $m_{n+1}$ is a rotation angle between the time point $t_n$ and the time point $t_{n+1}$. That is, when the angle formed by the two geomagnetism vectors $m_n$ and $m_{n+1}$ is denoted by Δϕ, a rotation angular velocity can be also calculated by the expression $\Delta\phi/(t_n-t_{n+1})$. That is, the ball rotational direction detecting system 1 in the present embodiment includes a rotational speed calculating unit 13 as well that calculates the rotational speed of the ball B in the previously-described manner. The rotational speed calculating unit 13 calculates the rotational speed of the ball B based on the rotational speed of the earth coordinate system $C_E$ in the ball coordinate system $C_B$ calculated by the coordinate rotation calculating unit 7.

It should be appreciated that the rotation axis of the earth coordinate system $C_E$ in the ball coordinate system $C_B$ coincides with the rotation axis of the ball coordinate system $C_B$ in the earth coordinate system $C_E$, and the rotational direction of the earth coordinate system $C_E$ in the ball coordinate system $C_B$ is a reverse direction to the rotational direction of the ball coordinate system $C_B$ in the earth coordinate system $C_E$.

Then, the rotational direction calculating unit 8 calculates the orientation of the rotation axis A and the rotational direction R of the ball B with respect to the traveling direction F and the gravity direction G, based on the traveling direction F, the gravity direction G, and the rotation axis and the rotational direction of the earth coordinate system $C_E$ in the ball coordinate system $C_B$ that have been calculated in the above-described manner. The orientation of the rotation axis A and the rotational direction R of the ball B with respect to the traveling direction F and the gravity direction G are to be calculated at each instant during the midair movement of the ball B.

Now, the traveling direction F and the gravity direction G in the ball coordinate system $C_B$ also change moment by moment. Therefore, as illustrated in FIG. 5, the traveling direction F and the gravity direction G in the ball coordinate system $C_B$ at the time point $t_n$ differ from the traveling direction F and the gravity direction G in the ball coordinate system $C_B$ at the time point $t_{n+1}$, respectively. Then, strictly speaking, this means that the traveling direction F and the gravity direction G, which are the references of the orientation of the rotation axis A and the rotational direction R of the ball B, are not determined, which can in turn lead to the consideration that the orientation of the rotation axis A and the rotational direction R of the ball B with respect to the traveling direction F and the gravity direction G cannot be calculated. However, by making the measurement interval sufficiently short, such as making it 4 ms or shorter, the traveling direction F and the gravity direction G in the ball coordinate system $C_B$ at the time point $t_n$ come to substantially coincide with the traveling direction F and the gravity direction G in the ball coordinate system $C_B$ at the time point $t_{n+1}$, respectively, and by using them as the references, it is possible to calculate the orientation of the rotation axis A and the rotational direction R of the ball B.

Alternatively, a direction being the average of the traveling direction F in the ball coordinate system $C_B$ at the time point $t_n$ and the traveling direction F in the ball coordinate system $C_B$ at the time point $t_{n+1}$ may be determined to be a traveling direction F between the time points $t_n$ to $t_{n+1}$ and a direction being the average of the gravity direction G in the ball coordinate system $C_B$ at the time point $t_n$ and the gravity direction G in the ball coordinate system $C_B$ at the time point $t_{n+1}$ may be determined to be the gravity direction G between the time point $t_n$ to $t_{n+1}$.

In every case, what is demanded is to calculate the rotation axis, the rotation angle, and the rotation angular velocity at each instant, and their time variations with high accuracy. For this reason, the magnetic sensor 2 and the acceleration sensor 3 are made to have sufficiently short intervals between measurement time points. Therefore, as the magnetic sensor 2 and the acceleration sensor 3, it is preferable to use sensors having the specifications that allow for measurement in a short time and have a high responsiveness.

Figure 7:
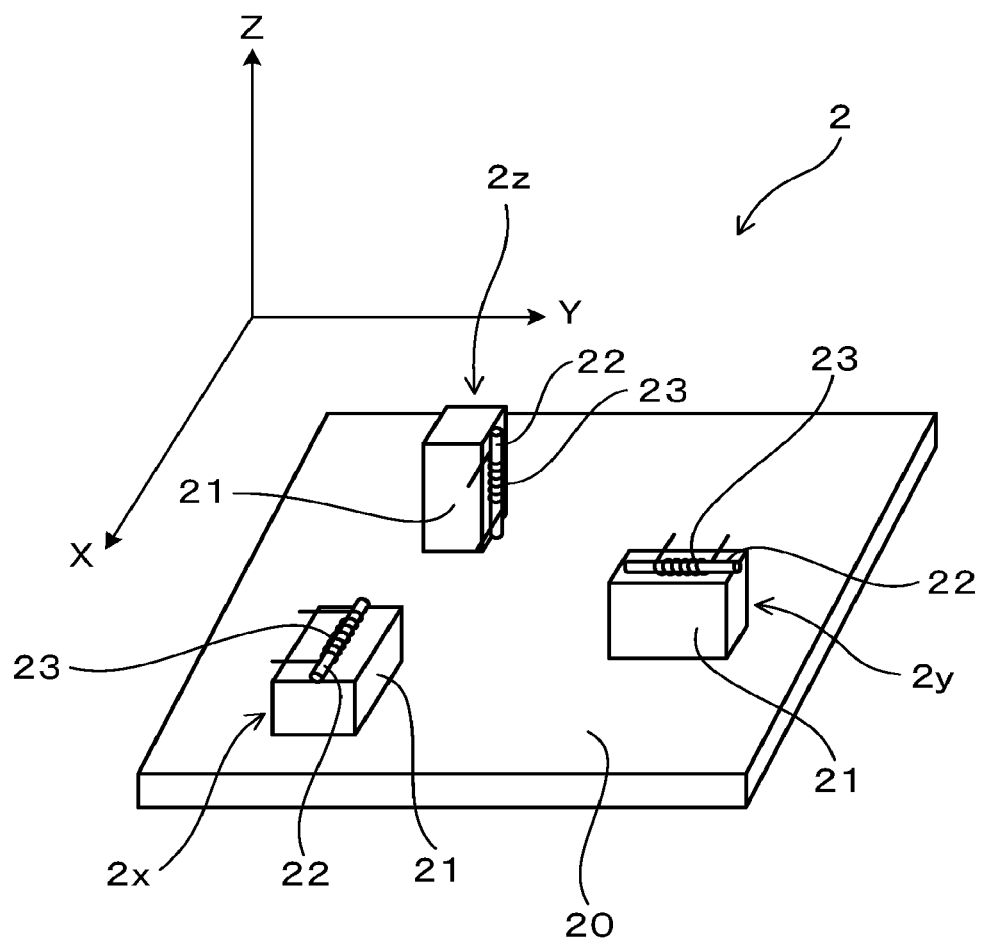
FIG. 7 is a schematic perspective view of a magnetic sensor in Embodiment 1.

Next, the structure of the magnetic sensor 2 will be described. The magnetic sensor 2 in the present embodiment is constituted by a magneto-impedance sensor. As illustrated in FIG. 7, the magnetic sensor 2 is formed by disposing three sensor elements 2x, 2y, and 2z on a sensor substrate 20, the sensor elements 2x, 2y, and 2z being arranged with their respective sensitivity directions oriented in three axis directions orthogonal to one another (X direction, Y direction, Z direction). The sensor elements 2x, 2y, and 2z are each constituted by a magneto-impedance sensor element.

The sensor elements 2x, 2y, and 2z each include a base 21 that is formed of a non-magnetic substance, an amorphous wire 22 that is fixed to the base 21, and a detecting coil 23 that is wound around the amorphous wire 22. Based on the magnitudes of geomagnetism in the axis directions detected by the sensor elements 2x, 2y, and 2z, the magnetic sensor 2 can detect the geomagnetism vector a in the ball coordinate system $C_B$ (the three-axis orthogonal coordinate system).

As the acceleration sensor 3, for example, a capacitive acceleration sensor can be used. One such acceleration sensor is, for example, KX022 (Kionix, Inc.).

In the present embodiment, the magnetic sensor 2, the acceleration sensor 3, the bearing recording unit 4, the traveling direction calculating unit 5, the gravity direction calculating unit 6, the coordinate rotation calculating unit 7, the rotational direction calculating unit 8, the magnetic dip recording unit 11, the traveling angle recording unit 12, and the rotational speed calculating unit 13 are built in the ball B. In addition, the ball B is equipped with a memory that stores data on the orientation of the rotation axis A and the rotational direction R of the ball B calculated by the rotational direction calculating unit 8, and data on the rotational speed of the ball B calculated by the rotational speed calculating unit 13.

However, all of these components need not be built in the ball B. For example, the rotational direction calculating unit 8 and the rotational speed calculating unit 13 can be provided in an external device that is separate component from the ball B. In this case, it is conceivable to perform data processing by causing the ball B to exchange data with the external device through wireless communication or the like.

As previously described, according to the ball rotational direction detecting system 1, by using the geomagnetism vector m and the acceleration vector a, it is possible to detect the orientation of the rotation axis A and the rotational direction R of the ball B with respect to the traveling direction F and the gravity direction G. It is therefore possible to detect the orientation of the rotation axis A and the rotational direction R of a ball moving in midair with respect to the traveling direction F and the gravity direction G of the ball, with a simple configuration.

This makes it possible to, for example, determine the type of pitch thrown by a baseball pitcher, or evaluate the quality of the pitch, with a simple configuration. Furthermore, it is possible to evaluate the type of pitch or the quality of pitch not only in qualitative terms but also in quantitative terms through digitization.

For example, in the case where the rotation axis A of a ball thrown by a right-handed pitcher roughly points in the gravity direction G, and the rotational direction R of the ball is counterclockwise when seen from above, the ball is determined to be a curveball or a slider. In the case where the rotation axis A of a ball thrown by a right-handed pitcher roughly points in the gravity direction G, and the rotational direction R of the ball is clockwise when seen from above, the ball is determined to be a screwball. In the case where the rotation axis A of a ball B is roughly orthogonal to both the traveling direction F and the gravity direction G of the ball B, and the rotational direction R of the ball B is reverse rotation (i.e., backspin: rotation that brings a surface on the front side of the ball B in the traveling direction F to move upward), the ball B is determined to be a fastball.

The distinction between a curveball and a slider can be made based on the orientation of the rotation axis A with respect to the traveling direction F and the gravity direction G of a ball. Alternatively, to make the distinction between a curveball and a slider, the rotational speed of the ball B may also be added into the basis for the determination, or the speed of the ball B may be added into the basis for the determination.

The curveball varies in the orientation of its rotation axis A with respect to the traveling direction F and the gravity direction G depending on pitchers or deliveries. For example, the rotation axis A may be oblique to the gravity direction G or may be oblique to the traveling direction F. Therefore, actual determination of the type of pitch may involve grasping in advance a pitcher's repertory of pitches (the types of pitch often thrown) and the characteristic of each piece of the repertory of pitches (e.g., the orientation of the rotation axis), and involve such programming that determines a ball to be one of the types of pitch when the ball is detected to have a rotation close to the characteristic of a corresponding piece of the repertory of pitches.

Only determining the type of pitch has been available by an expert baseball commentator or the like. However, with the system of the present embodiment, it is possible to evaluate a ball B itself thrown by a pitcher in quantitative terms using information on the orientation of the rotation axis A and the rotational direction R of the ball B with respect to the traveling direction F and the gravity direction G of the ball B. That is, by grasping the orientation of the rotation axis A and the rotational speed of the ball B, it is conceivable to help the improvement of the way of pitching of a pitcher such as a pitching form and a grip of a ball.

For example, as to the fastball, assuming that an ideal rotation axis A of a ball is orthogonal to both the traveling direction F and the gravity direction G of the ball, the rotation axis of a ball actually thrown is in some cases oblique to a direction orthogonal to both the traveling direction F and the gravity direction G. It is conceivable to detect such cases by the ball rotational direction detecting system 1 and use the information on the detection to help the improvement of the way of pitching of a pitcher.

In addition, when throwing a breaking ball, it is conceivable to change the orientation of the rotation axis the ball variously. As in such a case, when learning a desired breaking ball, it is possible to practice and improve how to pitch while confirming the rotation axis of a thrown ball.

As described above, according to the present embodiment, it is possible to provide a ball rotational direction detecting system that detects the orientation of the rotation axis and the rotational direction of a ball moving in midair with respect to the traveling direction and the gravity direction of the ball, with a simple configuration.

(Embodiment 2)

Figure 8:
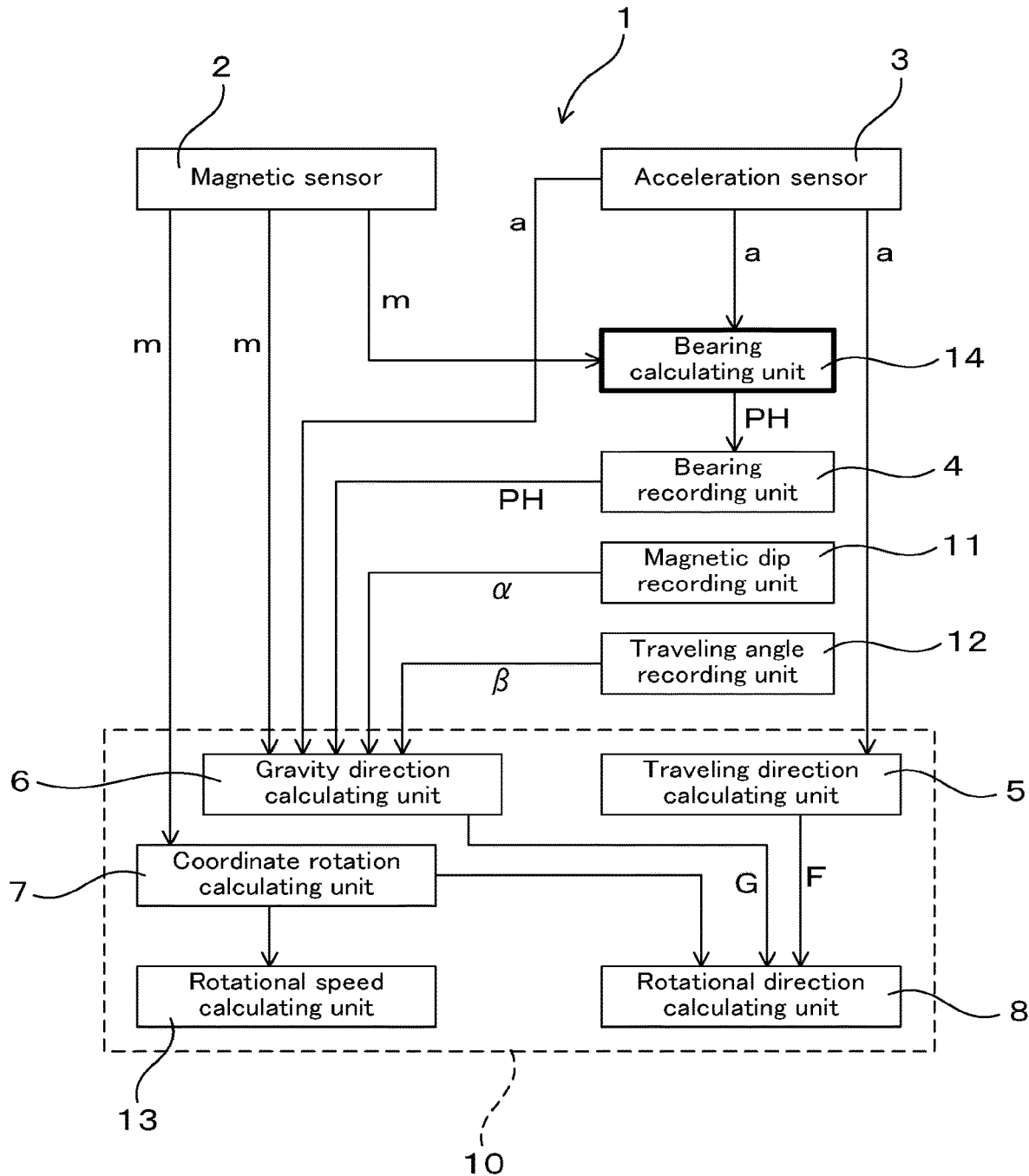
FIG. 8 is a conceptual diagram of a ball rotational direction detecting system in Embodiment 2.
Figure 9:
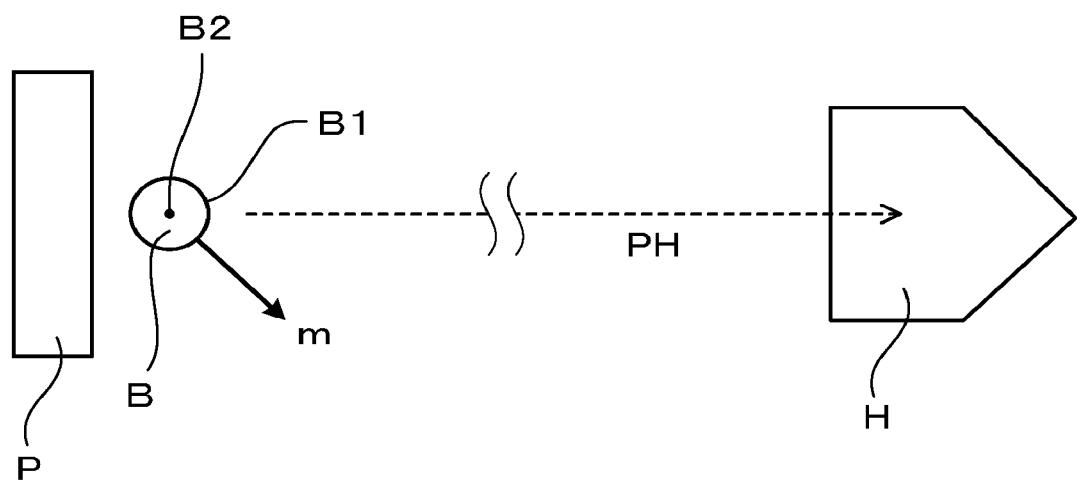
FIG. 9 is a schematic plan view illustrating how to calculate a moving bearing in Embodiment 2.
Figure 10:
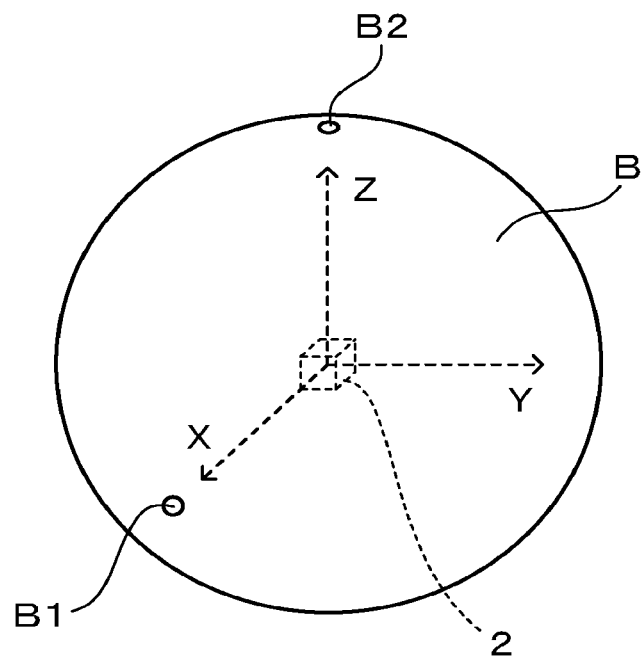
FIG. 10 is a schematic perspective view illustrating a first specific region and a second specific region in Embodiment 2.

The present embodiment is, as illustrated in FIG. 8 to FIG. 10, an embodiment of a ball rotational direction detecting system 1 that further includes a bearing calculating unit 14 that calculates the moving bearing of a ball.

That is, the bearing calculating unit 14 calculates a moving bearing PH based on the geomagnetism vector m detected by the magnetic sensor 2 with a ball B brought to a standstill in a predetermined posture.

Here, the term "predetermined posture" means, as illustrated in FIG. 9 and FIG. 10, a posture in which a first specific region B1 and a second specific region B2, which lie on the surface of a ball B and point in directions orthogonal to each other, are made to point in the moving bearing PH and a vertically upward direction.

The first specific region B1 and the second specific region B2 can serve as, for example, external visible marks on the surface of the ball B. The relation between the first specific region B1 and the second specific region B2, and the orientation of the geomagnetism sensor 2 fixed in the ball B has been grasped. For example, a region in the sensitivity direction of one of the sensor elements of the geomagnetism sensor 2 is set as the first specific region B1, and a region in the sensitivity direction of other one of the sensor elements is set as the second specific region B2. In the present embodiment, as illustrated in FIG. 10, the first specific region B1 is provided at a position in the positive direction of the X axis with respect to the center of gravity of the ball B, and the second specific region B2 is provided at a position in the positive direction of the Z axis with respect to the center of gravity of the ball B.

Then, as illustrated in FIG. 9, the ball B is brought to a standstill on the ground with the first specific region B1 pointing in the moving bearing PH, namely, in a bearing as a target of pitching, and the second specific region B2 pointing in the vertically upward direction. More specifically, the ball B is caused to stand on the pitcher's plate P or on the ground in the vicinity of the pitcher's plate P with the second specific region B2 pointing a upward direction, and the first specific region B1 pointing in the bearing to the home plate H. This makes the X-axis direction in the ball coordinate system $C_B$ coincide with a bearing in which a pitch is intended to be made, namely, the moving bearing PH, and makes the Z-axis direction coincide with the vertically upward direction.

Based on the relation between the horizontal direction component (projected vector on an X-Y plane) of the geomagnetism vector m detected in this state by the geomagnetism sensor 2 and the X-axis direction of the ball coordinate system $C_B$, the moving bearing PH is calculated. That is, since the horizontal direction component of the geomagnetism vector m points to the south, determining the orientation of the X axis with respect to the horizontal direction component leads to the determination of the bearing of the X axis, thereby in turn leading to the determination of the moving bearing PH.

The moving bearing PH calculated by the bearing calculating unit 14 in the above-described manner is recorded in the bearing recording unit 4. Then, the gravity direction calculating unit 6 uses the moving bearing PH to determine which of the two vectors G1 and G2 described in Embodiment 1 is selected as the vector in the gravity direction G.

In other respects, the present embodiment is the same as Embodiment 1.

It is noted that, of reference numerals used in Embodiment 2 or to be used in the subsequent Embodiments, reference numerals identical to those used in Embodiments having already been described refer to identical components or the like, unless otherwise noted.

In the present embodiment, it is possible to detect the moving bearing PH, namely, a bearing in which a pitch is intended to be made, using the magnetic sensor 2 fixed in the ball B. This is therefore useful, for example, in the case where measurement is performed in a location where a bearing in which a pitch is intended to be made is not grasped in advance. In addition, this facilitates the input of the moving bearing PH to the ball rotational direction detecting system 1.

In other respects, the present embodiment has the same operational advantages as those in Embodiment 1.

(Embodiment 3)

Figure 11:
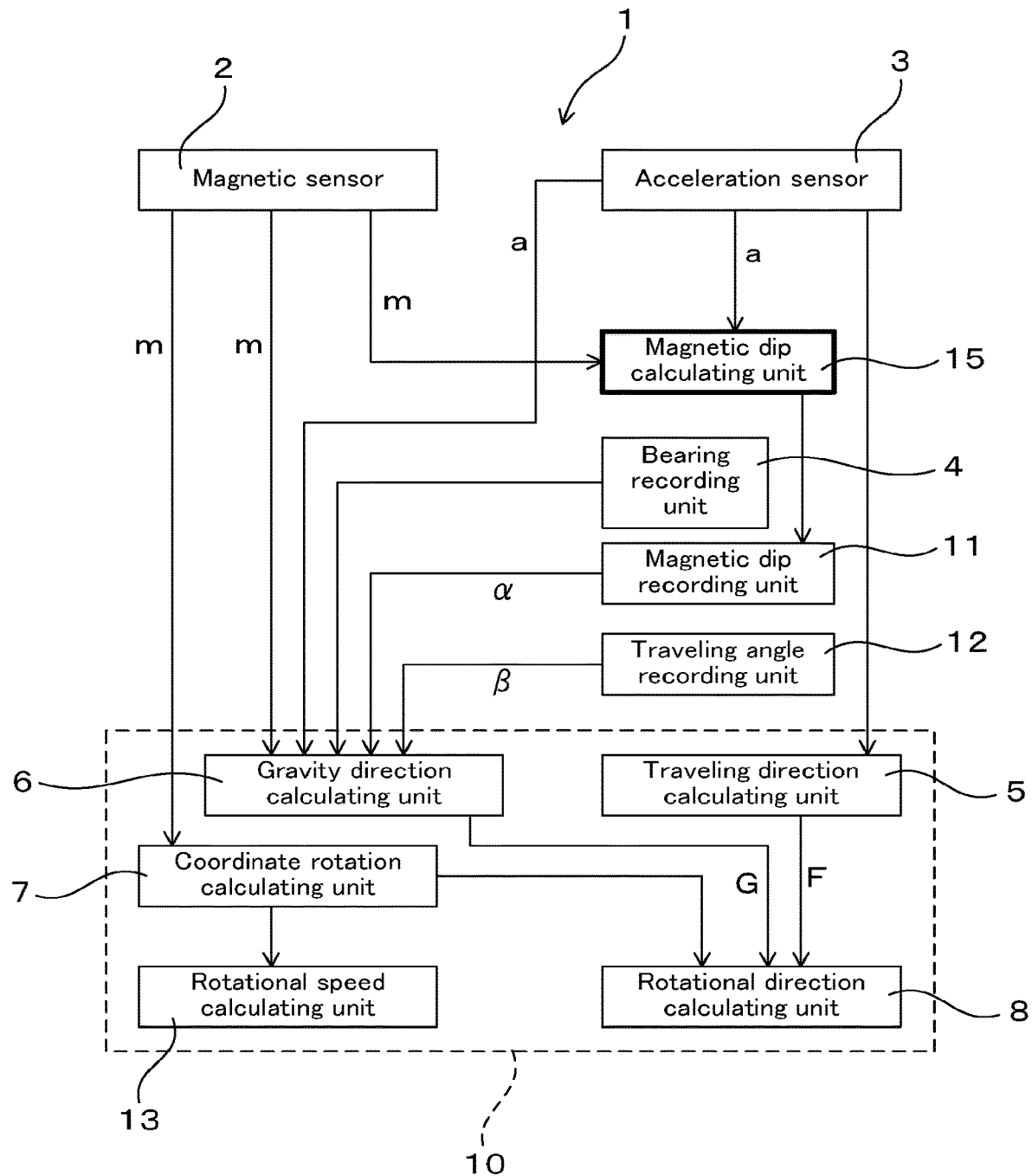
FIG. 11 is a conceptual diagram of a ball rotational direction detecting system in Embodiment 3.

The present embodiment is, as illustrated in FIG. 11, an embodiment of a ball rotational direction detecting system 1 further including a magnetic dip calculating unit 15 that calculates a magnetic dip α.

The magnetic dip calculating unit 15 calculates the magnetic dip α with a ball B brought to a standstill, based on the acceleration vector a detected by the acceleration sensor 3 and the geomagnetism vector m detected by the magnetic sensor 2.

Figure 12:
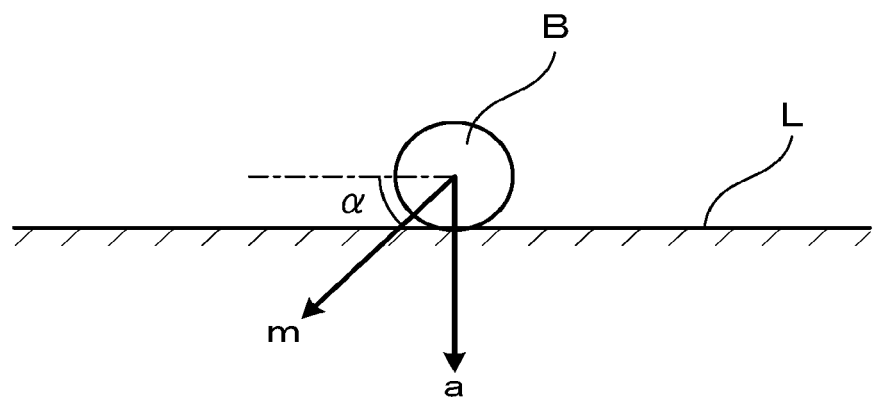
FIG. 12 is a schematic side view illustrating how to calculate a magnetic dip in Embodiment 3.

As illustrated in FIG. 12, in the state where the ball B is brought to a standstill, the direction of the acceleration vector a detected by the acceleration sensor 3 is also the gravity direction G. Therefore, detecting both this acceleration vector a and the geomagnetism vector m leads to the specification of an angle formed by the gravity direction G and the direction of the geomagnetism vector m, thereby in turn leading to the specification of an angle of the geomagnetism vector m with respect to a level surface, namely, the magnetic dip α.

The magnetic dip α calculated by the magnetic dip calculating unit 15 in such a manner is recorded in the magnetic dip recording unit 11.

In other respects, the present embodiment is the same as Embodiment 1.

In the present embodiment, it is possible to detect the magnetic dip α of geomagnetism at a measurement location using the magnetic sensor 2 and the acceleration sensor 3 fixed in the ball B. This is therefore useful, for example, in the case where measurement is performed in a location where a magnetic dip α is not grasped in advance. In addition, this facilitates the input of the magnetic dip α to the ball rotational direction detecting system 1.

In other respects, the present embodiment has the same operational advantages as those in Embodiment 1.

(Embodiment 4)

Figure 13:
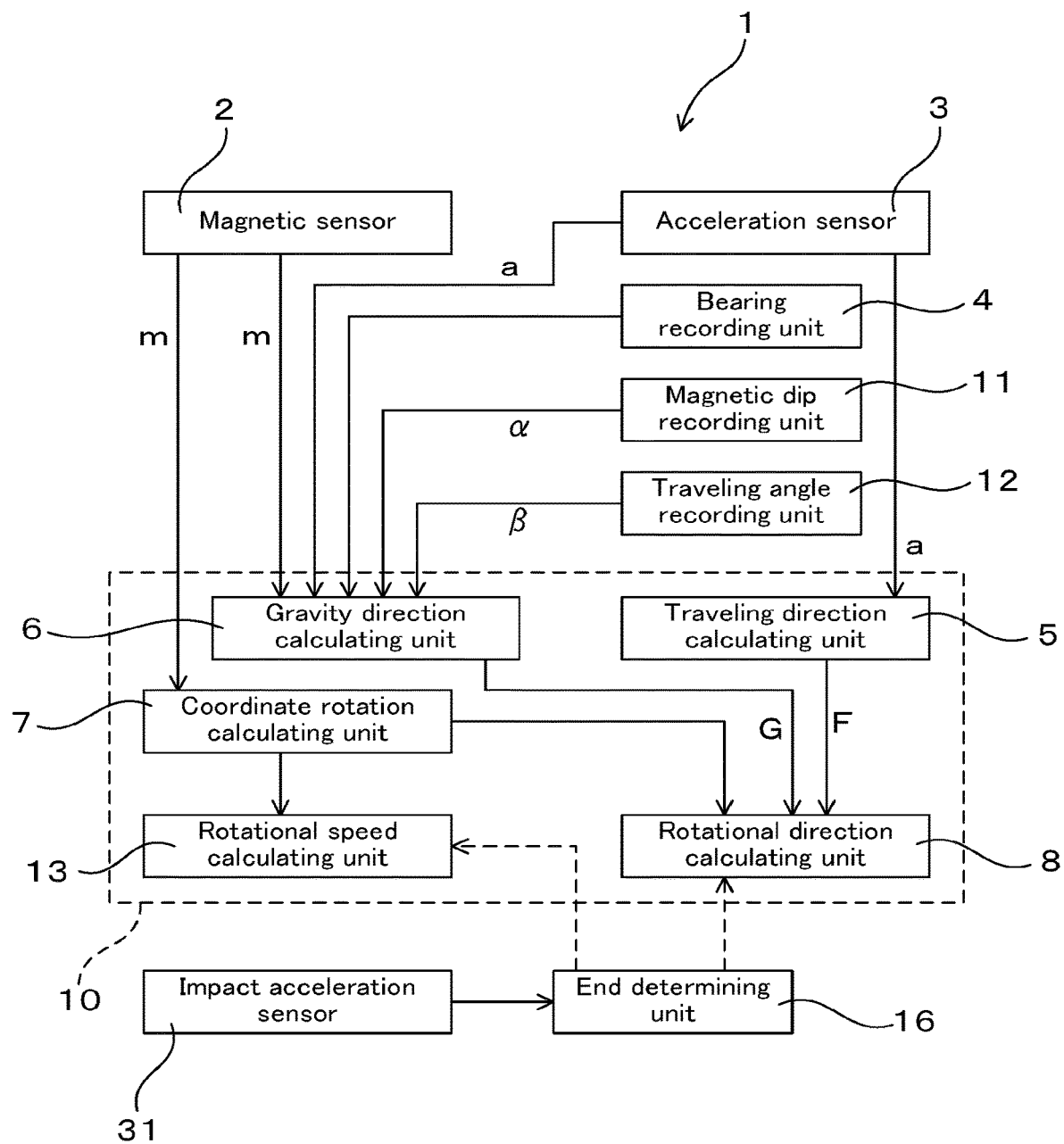
FIG. 13 is a conceptual diagram of a ball rotational direction detecting system in Embodiment 4.

The present embodiment is, as illustrated in FIG. 13, an embodiment of a ball rotational direction detecting system 1 further including an impact acceleration sensor 31 and an end determining unit 16 that determines a time point at which the midair movement of a ball B ends.

The impact acceleration sensor 31 is fixed in the ball B and detects an impact acceleration that has a magnitude greater than that of an acceleration vector m detected by the acceleration sensor 3, at least in one axis direction. In the present embodiment, the impact acceleration sensor 31 measures an impact acceleration in three axis directions that are orthogonal to one another. The impact acceleration sensor 31 may be fixed at a position that is off the center of gravity of the ball B.

The end determining unit 16 determines, based on the acceleration detected by the impact acceleration sensor 31, a time point at which the midair movement of the ball B ends (hereinafter, referred to as an end time point, as appropriate).

That is, when the midair movement of the ball B ends, the ball B collides with, for example, a mitt of a catcher, a bat of a batter, or the ground, so that a great impact acts on the ball B. This impact acting on the ball B can be measured as a great acceleration. This acceleration is detected by the impact acceleration sensor 31, and based on a signal of this detection, the end determining unit 16 determines the end time point.

With this determination, the ball rotational direction detecting system 1 can automatically terminate the detection of the orientation of the rotation axis A and the rotational direction R of the ball B, at the determined end time point. In addition, the ball rotational direction detecting system 1 can automatically terminate also the calculation of the rotational speed of the ball B, at the end time point.

The impact acceleration sensor 31 is lower than the acceleration sensor 3 in detection sensitivity and is wider than the acceleration sensor 3 in detection range. That is, since the acceleration sensor 3 detects the acceleration vector a due to air drag acting on the ball B, the acceleration sensor 3 is required to have a high detection sensitivity, whereas being allowed to have a relatively narrow detection range. However, since the impact acceleration sensor 31 needs to detect various kinds of impacts as described above, the impact acceleration sensor 31 has to have a wide detection range, while being allowed to have a relatively low detection sensitivity.

Therefore, in the present embodiment, besides the acceleration sensor 3 for detecting air drag, the impact acceleration sensor 31 for detecting an impact is fixed in the ball B. Then, the impact acceleration sensor 31 is lower than the acceleration sensor 3 in detection sensitivity and wider than the acceleration sensor 3 in detection range.

For example, as the acceleration sensor 3, KX022 (Kionix, Inc.) can be used, and as the impact acceleration sensor 31, H3LIS331DL (STMicroelectronics) can be used.

In such a manner, by lowering the detection sensitivity of the impact acceleration sensor 31, it is possible to prevent air drag acting on the ball B from being detected by the impact acceleration sensor 31 during the midair movement of the ball B. As a result, the impact acceleration sensor 31 continues to output a detected value of almost zero prior to detecting an impact with the end of the midair movement, which facilitates the clear detection of the end time point.

In other respects, the present embodiment has the same operational advantages as those in Embodiment 1.

(Embodiment 5)

Figure 14:
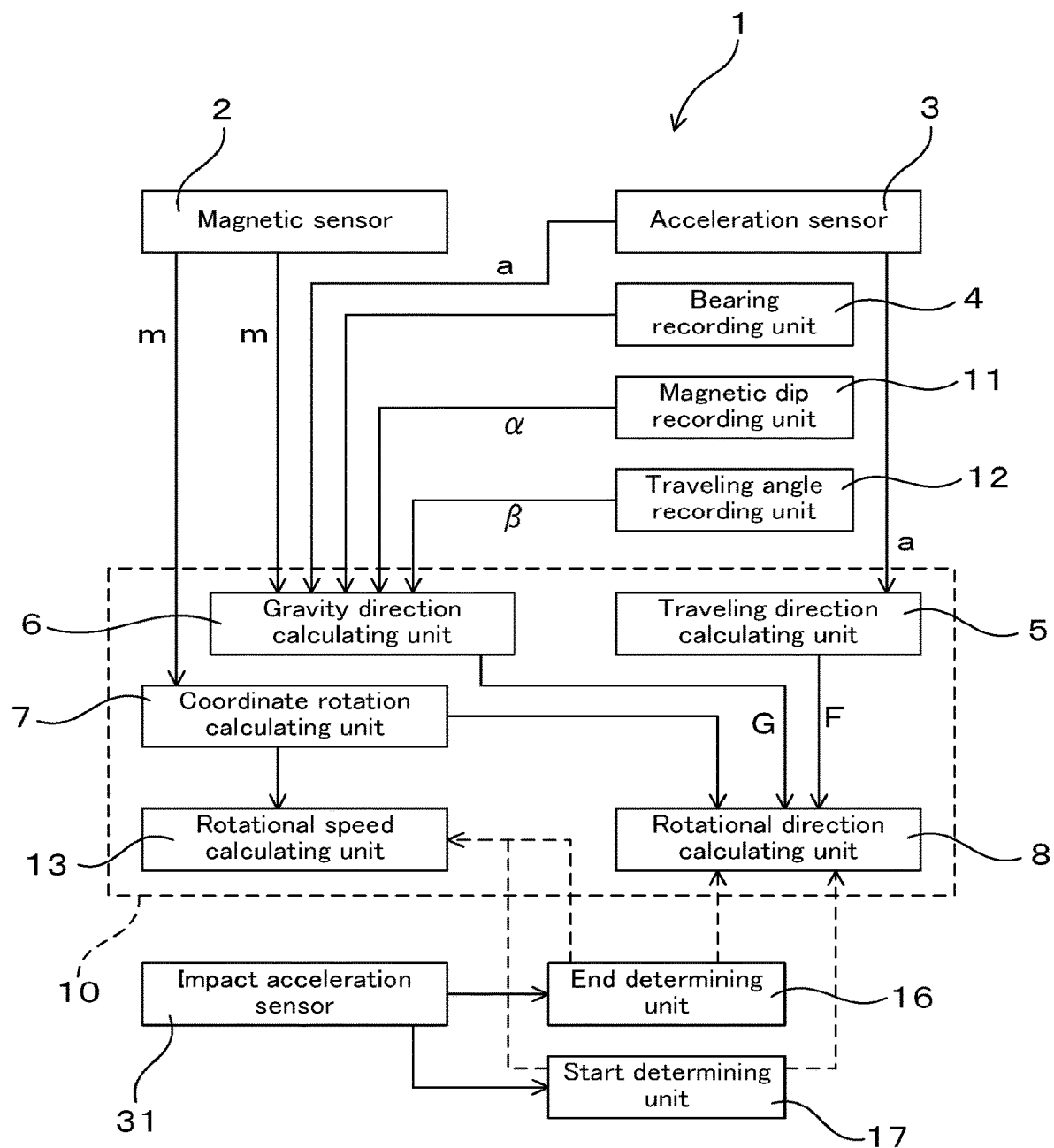
FIG. 14 is a conceptual diagram of a ball rotational direction detecting system in Embodiment 5.

The present embodiment is, as illustrated in FIG. 14, an embodiment of a ball rotational direction detecting system 1 further including a start determining unit 17 that detects a time point at which the midair movement of a ball B starts.

The start determining unit 17 determines, based on the acceleration detected by the impact acceleration sensor 31, a time point at which the midair movement of the ball B starts (hereinafter, referred to as a start time point, as appropriate).

That is, when the midair movement of the ball B starts, a great impact acts on the ball B from a fingertip of a pitcher. Then, after leaving the fingertip of the pitcher, the ball B basically receives only air drag as a force acting on it, which is sufficiently smaller than an impact force acting on it from the fingertip of the pitcher. Therefore, immediately before the impact acceleration sensor 31 continues to output a detected value of zero, the start time point of the midair movement of a ball can be grasped as a time point at which acceleration is detected. In the case where the impact acceleration sensor 31 is provided at a position that is considerably displaced from the center of gravity of the ball B, the impact acceleration sensor 31 receives centrifugal force acting on it with rotation, and during the midair movement, the value of the centrifugal force is substantially constant. For this reason, it is possible to determine a time point at which acceleration changes immediately before acceleration detected by the impact acceleration sensor 31 continues to be constant, as the start time point.

With this determination, the ball rotational direction detecting system 1 can grasp that a period between the determined start time point and the end time point is a period of the midair movement of the ball B. Therefore, it is possible to limit the detection of the orientation of the rotation axis A and the rotational direction R of the ball B to only this period. This is true for the calculation of the rotational speed of the ball.

In other respects, the present embodiment has the same configuration and the same operational advantages as those in Embodiment 4.

(Embodiment 6)

Figure 15:
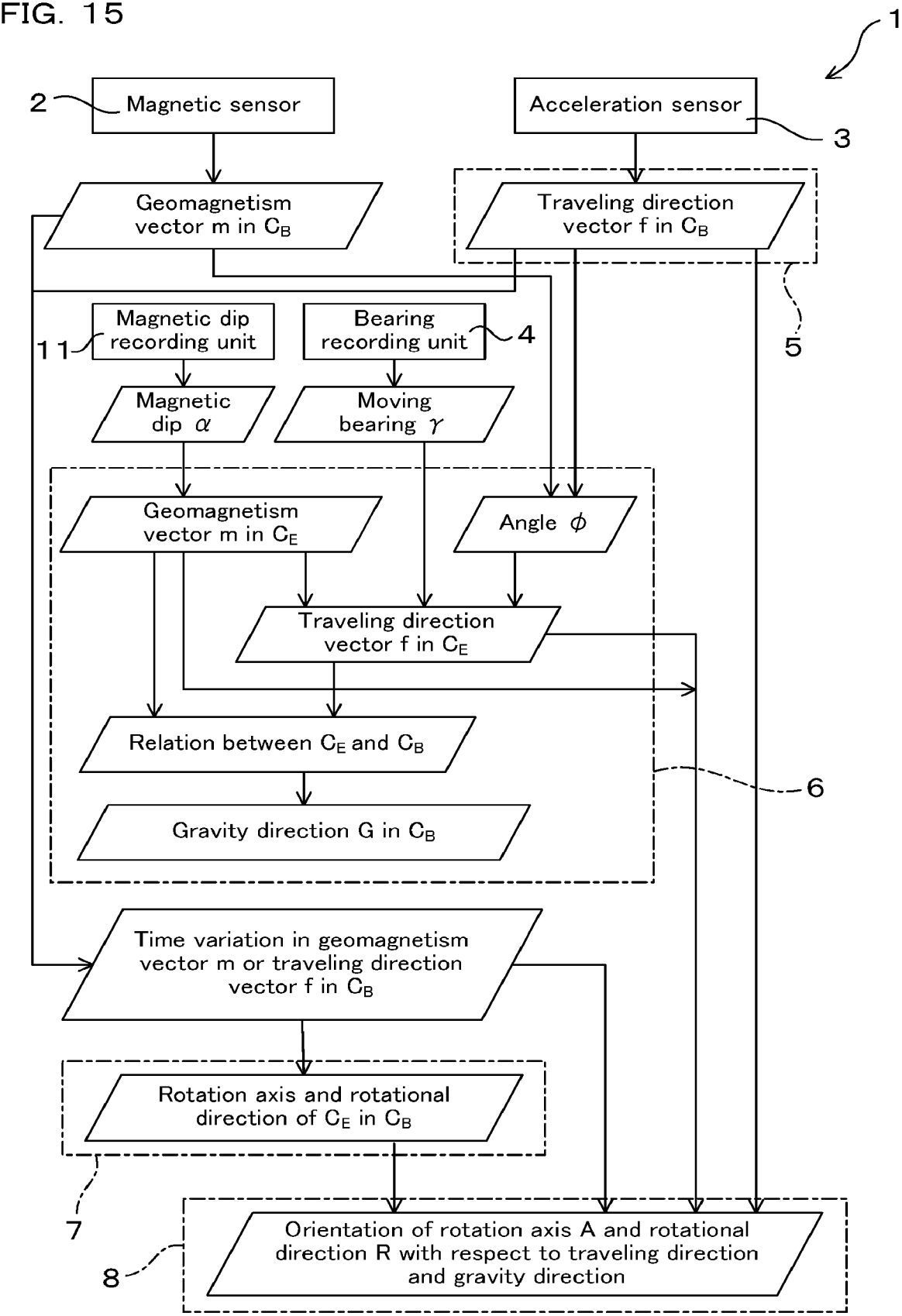
FIG. 15 is a conceptual diagram of a ball rotational direction detecting system in Embodiment 6.
Figure 16:
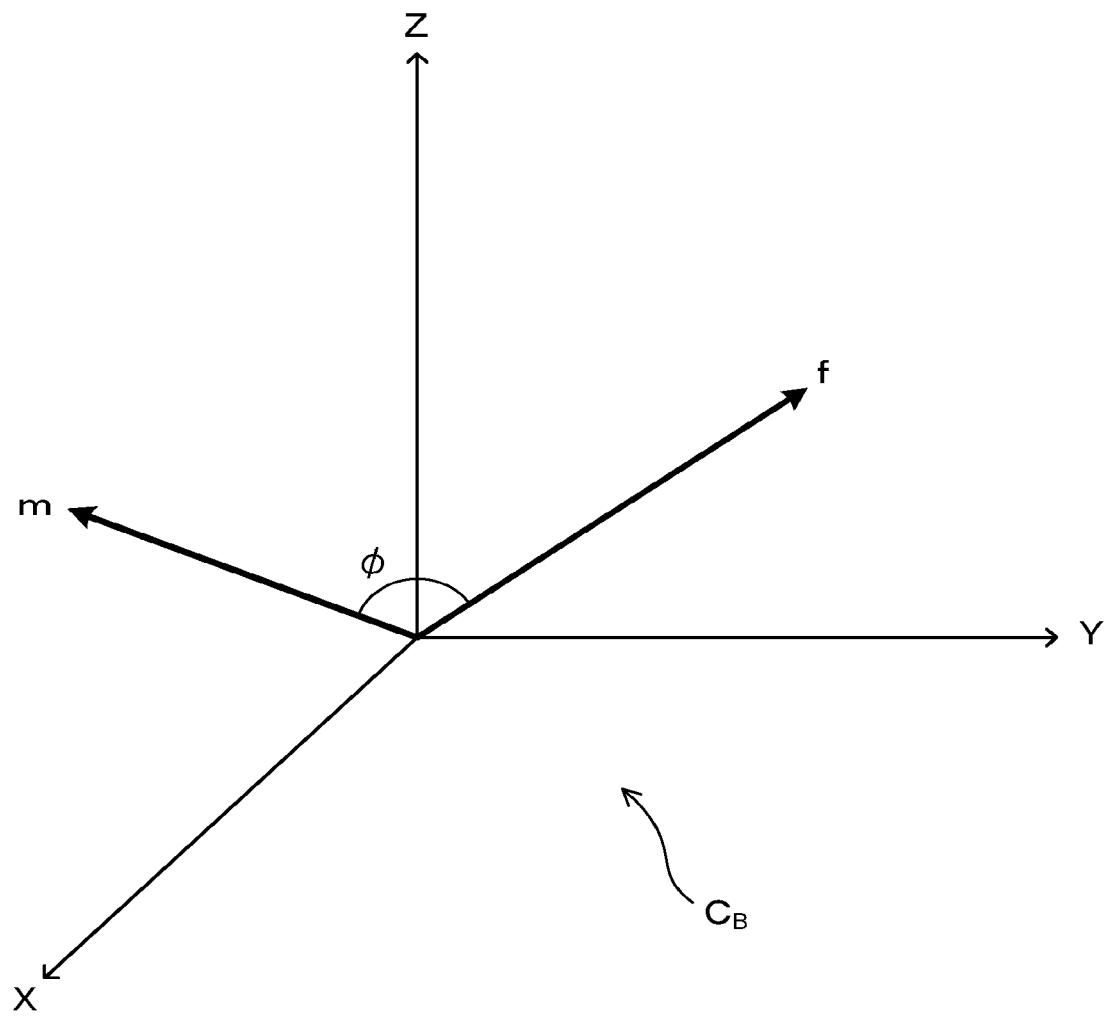
FIG. 16 is a schematic diagram of time variations in the acceleration vector and the geomagnetism vector in the ball coordinate system in Embodiment 6.
Figure 17:
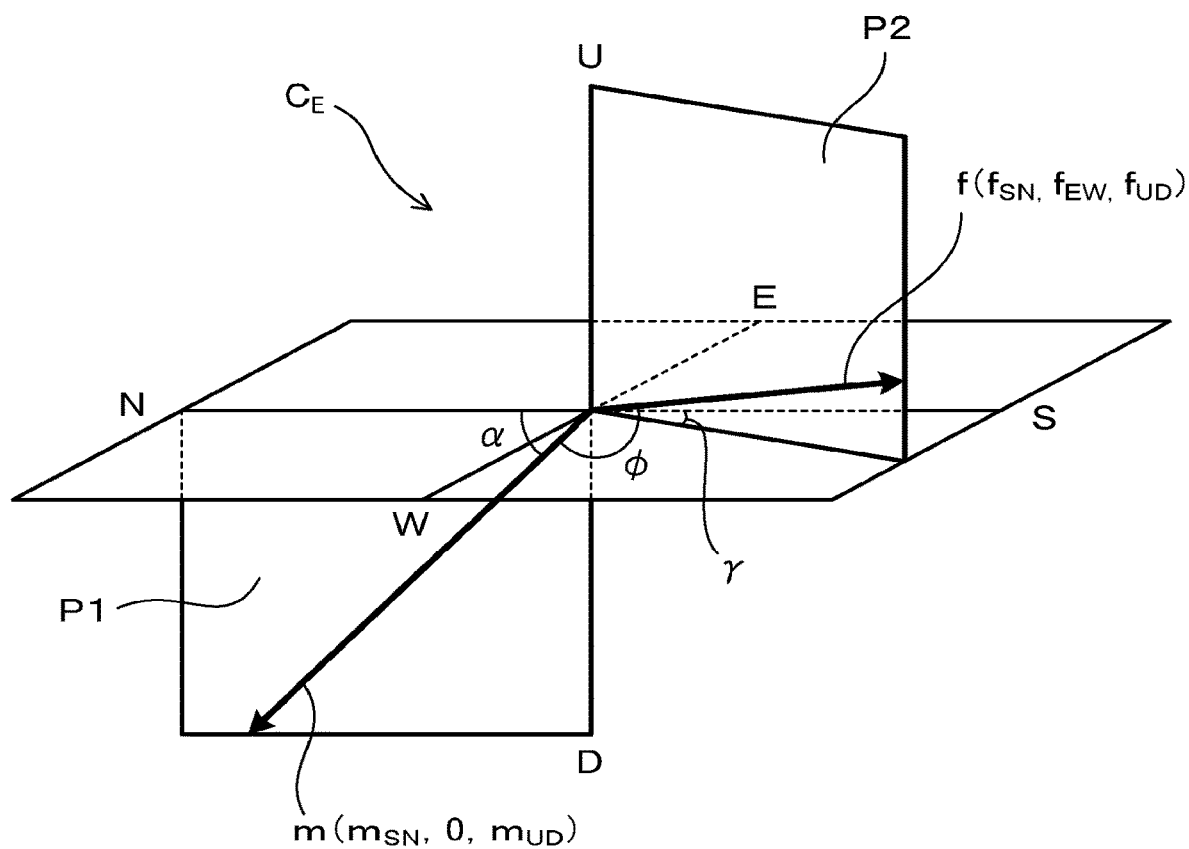
FIG. 17 is a schematic diagram of the acceleration vector and the geomagnetism vector in the earth coordinate system in Embodiment 6.

The present embodiment is, as illustrated in FIG. 15 to FIG. 17, an embodiment that calculates the orientation of the rotation axis A and the rotational direction R of a ball B with respect to the traveling direction F and the gravity direction G of the ball B without inputting in advance a traveling angle β of a ball B (the angle formed by the traveling direction F of the ball B and the gravity direction G illustrated in FIG. 3). FIG. 15 is a conceptual diagram including a flow of calculation performed in a ball rotational direction detecting system 1 of the present embodiment.

First, a geomagnetism vector m and a traveling direction vector f in a ball coordinate system $C_B$ illustrated in FIG. 16 are calculated. The geomagnetism vector m in the ball coordinate system $C_B$ can be obtained based on an output of the magnetic sensor 2 by a method as in Embodiment 1. The traveling direction vector f in the ball coordinate system $C_B$ is obtained as a vector in an opposite direction to an acceleration vector a that is obtained based on an output of the acceleration sensor 3. A calculating unit that calculates this traveling direction vector f in the ball coordinate system $C_B$ corresponds to the traveling direction calculating unit 5. Here, the geomagnetism vector m and the traveling direction vector f are calculated as unit vectors.

Next, an angle φ formed by these geomagnetism vector m and traveling direction vector f is calculated. That is, the geomagnetism vector m and the traveling direction vector f in the ball coordinate system $C_B$ consecutively change as the ball B rotates, but the angle formed by both does not change as long as the ball B travels straight ahead. Thus, based on the geomagnetism vector m and the traveling direction vector f in the ball coordinate system $C_B$ at each instant, the angle φ formed by both is specifically calculated. This angle φ remains unchanged also in the earth coordinate system $C_E$, as illustrated in FIG. 17. That is, the angle formed by the geomagnetism vector m and the traveling direction vector f in the earth coordinate system $C_E$ is naturally equal to φ.

Next, the geomagnetism vector m is, as illustrated in FIG. 17, fixed as a specific vector value in the earth coordinate system $C_E$. The geomagnetism vector m exists on a plane P1 containing both of a north-south bearing axis SN and an up-down direction axis UD in the earth coordinate system $C_E$. In the Northern Hemisphere, the geomagnetism vector m points in a downward direction oblique to the north N by the angle of a magnetic dip α. Furthermore, since the geomagnetism vector m is defined as a unit vector as described above, the magnitude of the geomagnetism vector m is one. Therefore, when the geomagnetism vector m in the earth coordinate system $C_E$ is denoted in the form of three orthogonal components (north-south bearing SN, east-west bearing EW, up-down direction UD) as $(m_{SN}, 0, m_{UD})$, tan $\alpha = m_{UD}/m_{SN}$, and $m_{SN}^2 + m_{UD}^2 = 1$ are satisfied.

From these two relational expressions, $m_{SN}$ and $m_{UD}$ are obtained uniquely. That is, the geomagnetism vector m in the earth coordinate system $C_E$ is obtained uniquely.

It is noted here that the bearing of the geomagnetism is assumed to coincide with the north-south bearing SN without a magnetic declination taken into consideration. In the case where the magnetic declination is also taken into consideration in the calculation, calculation that compensates for the magnetic declination may be performed.

Next, the traveling direction vector f in the earth coordinate system $C_E$ is calculated. At this point, a moving bearing γ of the ball B is used. Here, the moving bearing γ can be defined as an angle with respect to the south S. The moving bearing γ of the ball B is obtained in advance in the form of information and recorded in the bearing recording unit 4. The moving bearing γ of the ball B can be grasped in advance based on, for example, the positional relation between a pitcher's plate and a home plate in a ballpark being a measurement site. Alternatively, the moving bearing γ can be measured by some method. One such measuring method is the method having been presented in Embodiment 2 previously described.

The moving bearing being γ as described above means that, in the earth coordinate system $C_E$, the traveling direction vector f exists on a plane P2 that contains the up-down direction axis UD and is parallel to the moving bearing γ. Therefore, when the traveling direction vector f in the earth coordinate system $C_E$ is denoted in the form of three orthogonal components (north-south bearing SN, east-west bearing EW, up-down direction UD) as $(f_{SN}, f_{EW}, f_{UD})$, $f_{SN}$, $f_{EW}$, and $f_{UD}$ satisfy the following two relational expressions.

$$f_{SN}^2 + f_{EW}^2 + f_{UD}^2 = 1 \quad \text{Expression (1)}$$

$$\tan \gamma = f_{SN}/f_{EW} \quad \text{Expression (2)}$$

Furthermore, since the angle formed by traveling direction vector f and the geomagnetism vector m is fixed at φ as previously described, the scalar product of the two vectors f·m is cos φ. That is, the following expression is also satisfied.

$$(m_{SN}, 0, m_{UD}) \cdot (f_{SN}, f_{EW}, f_{UD}) = \cos \phi \quad \text{Expression (3)}$$

By solving a system of simultaneous equations consisting of the three Expressions (1), (2), (3), three unknown quantities $f_{SN}$, $f_{EW}$, $f_{UD}$ are calculated. The traveling direction vector f in the earth coordinate system $C_E$ can thereby be calculated.

In such a manner, the geomagnetism vector m and the traveling direction vector f in the earth coordinate system $C_E$ can be calculated uniquely. As a result, the relation between the earth coordinate system $C_E$ and the ball coordinate system $C_B$ is calculated uniquely. This also enables the up-down direction axis UD in the ball coordinate system $C_B$ to be calculated uniquely. That is, the gravity direction G in the ball coordinate system $C_B$ is calculated uniquely. A calculating unit that performs the calculation of the gravity direction G in the ball coordinate system $C_B$ described thus far corresponds to the gravity direction calculating unit 6. The traveling direction F in the ball coordinate system $C_B$ is determined uniquely from the traveling direction vector f previously described.

Next, the rotation axis and the rotational direction of the earth coordinate system $C_E$ in the ball coordinate system $C_B$ are calculated based on time variations in the geomagnetism vector m or the traveling direction vector f in the ball coordinate system $C_B$. That is, as the ball B rotates, the ball coordinate system $C_B$ rotates with respect to the earth coordinate system $C_E$. Since the geomagnetism vector m and the traveling direction vector f are fixed in the earth coordinate system $C_E$, the geomagnetism vector m and the traveling direction vector f rotate in the ball coordinate system $C_B$ as the ball B rotates. Therefore, based on changes in the output value of the magnetic sensor 2, the rotation axis and the rotational direction of the traveling direction vector m in the ball coordinate system $C_B$ can be calculated. In addition, based on changes in the output value of the acceleration sensor 3, the rotation axis and the rotational direction of the geomagnetism vector m in the ball coordinate system $C_B$ can be calculated. These rotation axis and the rotational direction of the geomagnetism vector m in the ball coordinate system $C_B$, or these rotation axis and the rotational direction of the traveling direction vector f in the ball coordinate system $C_B$ are the rotation axis and the rotational direction of the earth coordinate system $C_E$ in the ball coordinate system $C_B$, respectively. A calculating unit that calculates the rotation axis and the rotational direction of the earth coordinate system $C_E$ in the ball coordinate system $C_B$ in such a manner corresponds to the coordinate rotation calculating unit 7.

As previously described, since the gravity direction G and the traveling direction F in the ball coordinate system $C_B$ are obtained uniquely, the orientation of the rotation axis A of the ball B with respect to the traveling direction F and the gravity direction G can be calculated based on the rotation axis of the earth coordinate system $C_E$ in the ball coordinate system C. Furthermore, the rotational direction of the ball B can be calculated as a rotational direction that is a reverse direction to the rotational direction of the earth coordinate system $C_E$ in the ball coordinate system C. This enables the calculation of the orientation of the rotation axis A and the rotational direction R of the ball B with respect to the traveling direction F and the gravity direction G. A calculating unit that calculates the orientation of the rotation axis A and the rotational direction R of the ball B with respect to the traveling direction F and the gravity direction G in such a manner corresponds to the rotational direction calculating unit 8.

In the present embodiment, the input of the moving bearing γ of the ball B dispenses with the input of the traveling angle β of the ball B (the angle formed by the traveling direction F of the ball B and the gravity direction G illustrated in FIG. 3). It is therefore possible to detect accurately the orientation of the rotation axis A and the rotational direction R of the ball B without preparation, for example, measuring in advance the traveling angle β that varies depending on the physique or the pitching form of a pitcher.

In other respects, the present embodiment has the configuration and the operational advantages similar to Embodiment 1.

(Embodiment 7)

Figure 18:
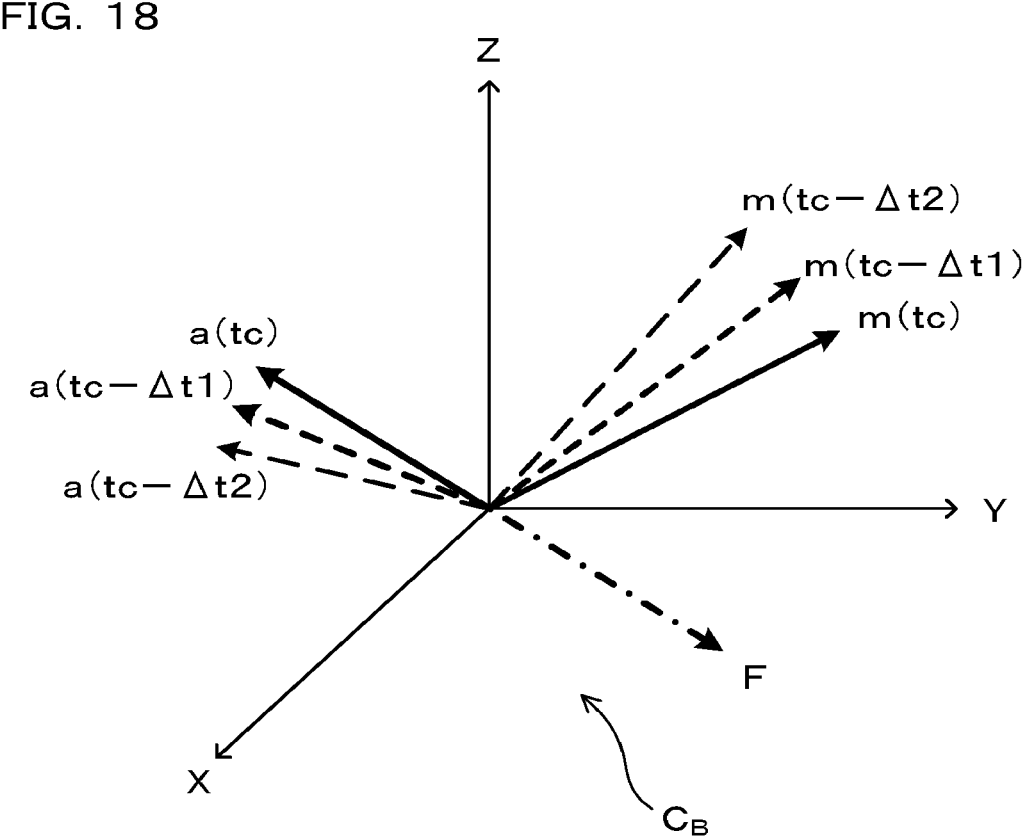
FIG. 18 is a schematic diagram of the acceleration vector and the geomagnetism vector in the ball coordinate system in Embodiment 7.

The present embodiment is, as illustrated in FIG. 18, an embodiment that calculates the traveling direction F in the ball coordinate system $C_B$ based on an acceleration vector a(tc) at the time when a thrown ball B is caught.

That is, in the ball rotational direction detecting system 1 in the present embodiment, the acceleration vector a at the time when the thrown ball B is caught is detected by the acceleration sensor 3 as a catching-time acceleration vector a(tc). Based on this detected catching-time acceleration vector a(tc), the traveling direction F in the ball coordinate system $C_B$ is calculated.

At an instant at which a ball B thrown by a pitcher is caught by a catcher, the ball B receives a great acceleration acting on it due to an impact. That is, the acceleration acts on the ball B in a direction reverse to the traveling direction F of the ball B. This acceleration vector a is detected by the acceleration sensor 3. Then, this acceleration vector is recorded in the memory as the catching-time acceleration vector a(tc).

The catching-time acceleration vector a(tc) is a vector pointing in a direction opposite to the traveling direction F in the ball coordinate system C. Therefore, based on this catching-time acceleration vector a(tc), the traveling direction F in the ball coordinate system $C_B$ can be calculated.

In addition, at a catching time point tc, the gravity direction G in the ball coordinate system $C_B$ can be calculated based on a geomagnetism vector m(tc) detected by the magnetic sensor 2 and the catching-time acceleration vector a(tc). At this point, as in Embodiment 1, the moving bearing of the ball B recorded in the bearing recording unit 4, the magnetic dip α recorded in the magnetic dip recording unit 11, and the traveling angle 1 recorded in the traveling angle recording unit 12 can also be used.

In such a manner, as data items at the catching time point, the traveling direction F, the gravity direction G, and the geomagnetism vector m in the ball coordinate system $C_B$ can be calculated. As to how to calculate these data items, the method according to Embodiment 1 can be employed.

In addition, data on the geomagnetism vector m in the ball coordinate system $C_B$ during a period during which the thrown ball B is in midair can be accumulated in the memory. Therefore, as illustrated in FIG. 18, geomagnetism vectors m(tc-Δt1) and m(tc-Δt2) at time points predetermined small time periods Δt1 and Δt2 before the catching time point tc can be employed, respectively. Here, assume that Δt1<Δt2. Based on these geomagnetism vectors m(tc-Δt1) and m(tc-Δt2), and the geomagnetism vector m(tc) at the catching time point tc, the rotation axis and the rotational direction of the earth coordinate system $C_E$ in the ball coordinate system $C_B$ can be calculated. Therefore, the rotation axis and the rotational direction of the ball coordinate system $C_B$ with respect to the earth coordinate system $C_E$ can be calculated.

Specifically, the difference between the geomagnetism vectors m(tc-Δt1) and m(tc-Δt2), and the difference between the geomagnetism vectors m(tc-Δt1) and m(tc) are calculated, and the vector product of these two difference vectors is calculated. The orientation of a vector being the vector product is the orientation of the rotation axis. Then, the direction of a difference vector with respect to this rotation axis is the rotational direction of the earth coordinate system $C_E$ in the ball coordinate system $C_B$, and a direction opposite to the rotational direction of the earth coordinate system $C_E$ is the rotational direction of the ball coordinate system $C_B$ with respect to the earth coordinate system $C_E$.

Then, in the case where the small time period Δt1 is sufficiently short, during which the posture of the ball B can therefore be considered to hardly change with respect to the earth coordinate system $C_E$, the traveling direction F and the gravity direction G in the earth coordinate system $C_E$ calculated in the above-described manner can also be considered to hardly change. In this case, the rotation axis and the rotational direction of the ball coordinate system $C_B$ with respect to these traveling direction F and gravity direction G can be calculated.

As a method of this calculation, the same method as that in Embodiment 1 can be used.

In the case where the posture of the ball B considerably changes with respect to the earth coordinate system $C_E$ during the small time periods Δt1 and Δt2, the traveling direction F and the gravity direction G in the ball coordinate system $C_B$ at the time points tc-Δt1 and tc-Δt2 need to be calculated as well. In this case, the geomagnetism vectors m(tc-Δt2), m(tc-Δt1), m(tc) at respective time points considerably differ in direction from each other, and the traveling direction F and the gravity direction G can also considerably change. Thus, an average direction of traveling directions F at the time points tc-Δt2, tc-Δt1, and tc is assumed to be the reference of the traveling direction F, and an average direction of gravity directions G at the time points tc-Δt2, tc-Δt1, and tc is assumed to be the reference of the gravity direction G. Then, the rotation axis and the rotational direction of the ball coordinate system $C_B$ can be calculated with respect to these references of the traveling direction F and the gravity direction G.

It is noted that, setting the small time period Δt1 and a small time period (Δt2-Δt1) so that the rotation of the ball B during these periods becomes, for example, about π/2 facilitates an increase in accuracy of the calculation of the rotation axis.

In such a manner, it is possible to calculate the orientation of the rotation axis and the rotational direction with respect to the traveling direction F and the gravity direction G of the ball B during a small time period immediately before catching.

While the ball B being a sphere is in midair, the rotation axis basically does not change. For this reason, when the orientation of the rotation axis and the rotational direction with respect to the traveling direction F of the ball B and the gravity direction G during a small time period immediately before catching are obtained, the information on the orientation of the rotation axis and the rotational direction is considered to roughly match the information on the ball B during the entire period during which the ball B is in midair. Therefore, based on the information on the small time period immediately before catching, the orientation of the rotation axis and the rotational direction with respect to the traveling direction F and the gravity direction G of the ball B can be obtained and used for the determination of the type of pitch or the like.

However, strictly speaking, the rotation axis may slightly change while the ball B is in midair. For example, it is considered that the surface of the ball not necessarily being uniform due to the seams or the like of the ball, the ball not necessarily having a uniform weight distribution, and the like may cause the rotation axis to slightly change under the influence of air viscosity.

In the case where the orientation of the rotation axis and the rotational direction of the ball B with such a slight change in the rotation axis taken into consideration, the rotation axis of the ball B at any time point in a period of being in midair can be calculated by the following method.

That is, based on the traveling direction F and the gravity direction G in the ball coordinate system $C_B$ at the catching time point tc calculated in the above-described manner, and the rotation axis and the rotational direction of the ball B during the small time period immediately before catching, the traveling direction F and the gravity direction G in the ball coordinate system $C_B$ at time points the small time periods Δt1 and Δt2 before the catching time point tc, namely, at the time points tc-Δt1 and tc-Δt2 can be calculated. The rotation axis and the rotational direction of the ball B during the small time period immediately before catching can be calculated from the three geomagnetism vectors m(tc), m(tc-Δt1), and m(tc-Δt2), as previously described.

Then, by using one by one a large number of geomagnetism vectors m that are consecutively obtained while the ball B is in midair, it is possible to calculate the traveling direction F and the gravity direction G in the ball coordinate system $C_B$ at each time point (e.g., time points tc, tc-Δt1, tc-Δt2, . . . , tc-Δtn, . . . ) and furthermore to calculate the rotation axis and the rotational direction of the ball B in the ball coordinate system $C_B$ at each time point, while tracing back time the time points. As a result, it is possible to calculate the orientation of the rotation axis and the rotational direction with respect to the traveling direction F and the gravity direction G of the ball B at each time point.

In the present embodiment, using the catching-time acceleration vector a(tc) detected upon an impact at the catching time point, it is possible to calculate the traveling direction F of the ball B. For this reason, it is not necessary to use a sensor having a particularly high detection sensitivity as the acceleration sensor 3. As a result, it is possible to detect the traveling direction F at low cost, easily and accurately.

In other respects, the present embodiment has the same operational advantages as those of Embodiment 1.

The present invention is not limited to the above-described embodiments and applicable to various embodiments without departing from the gist of the present invention. For example, any one of the embodiments can be combined with another as appropriate, and for example, Embodiment 2 and Embodiment 3 can be combined.

The above-described embodiments are described about the example in which the orientation of the rotation axis and the rotational direction of a ball thrown by a baseball pitcher are measured, but the application of the ball rotational direction detecting system is not limited to the example. For example, in tennis, the orientation of the rotation axis, the rotational direction, and the like of a ball in a serve or a stroke can be a measurement object. Not only to baseball and tennis, the ball rotational direction detecting system is also applicable to the other ball games including softball, golf, table tennis, volleyball, and soccer. The ball rotational direction detecting system including the start determining unit described in Embodiment 5 is particularly useful for tennis, golf, soccer, and the like, in which a particularly great impact acts at the start time point.

The invention claimed is:

1. A ball rotational direction detecting system that detects an orientation of a rotation axis and a rotational direction of a ball moving in midair with respect to a traveling direction and a gravity direction of the ball, the ball rotational direction detecting system comprising:
　　a magnetic sensor that detects a geomagnetism vector in a ball coordinate system, which is a three-axis orthogonal coordinate system fixed in the ball;
　　an acceleration sensor that detects an acceleration vector in the ball coordinate system; and
　　circuitry configured to:
　　　record a moving bearing, the moving bearing functioning as compass bearings and being a bearing in which the ball moves;
　　　record a magnetic dip of geomagnetism;
　　　calculate the orientation of the rotation axis and the rotational direction of the ball with respect to the traveling direction and the gravity direction by using all of 1) the geomagnetism vector, 2) the acceleration vector, 3) the moving bearing, 4) the magnetic dip, and 5) one of a first time variation in the geomagnetism vector and a second time variation in the acceleration vector;
　　　calculate two vectors to be candidates of the gravity direction in the ball coordinate system by using the geomagnetism vector detected by the magnetic sensor, the acceleration vector detected by the acceleration sensor, and the magnetic dip; and
　　　specify one of the two vectors thus calculated as a vector in the gravity direction in the ball coordinate system by using the moving bearing,
　　wherein the circuitry specifies by selecting one of the two vectors closer to a vector product (m×a) of a magnetic vector m and the acceleration vector a as the vector in the gravity direction in the ball coordinate system in a first case where the moving bearing includes a westward vector component, and the circuitry specifies by selecting another of the two vectors closer to another vector product (a×m) of the acceleration vector a and the magnetic vector m as the vector in the gravity direction in the ball coordinate system in a second case where the moving bearing includes an eastward vector component.

2. The ball rotational direction detecting system according to claim 1, wherein
the circuitry is configured to:
calculate the traveling direction in the ball coordinate system by using the acceleration vector detected by the acceleration sensor;
calculate another rotation axis and another rotational direction of an earth coordinate system in the ball coordinate system by using the first time variation in the geomagnetism vector detected by the magnetic sensor or the second time variation in the acceleration vector detected by the acceleration sensor; and
calculate the orientation of the rotation axis and the rotational direction of the ball with respect to the traveling direction and the gravity direction by using the traveling direction in the ball coordinate system, the gravity direction in the ball coordinate system, and the other rotation axis and the other rotational direction of the earth coordinate system in the ball coordinate system.

3. The ball rotational direction detecting system according to claim 1, wherein the circuitry is further configured to:
record a traveling angle $\beta$, the traveling angle $\beta$ being an angle formed by the traveling direction and the gravity direction of the ball, wherein
assuming that, with the magnetic dip denoted by $\alpha$, an angle formed by the geomagnetism vector and the gravity direction is $90°-\alpha$, and an angle formed by the acceleration vector and the gravity direction is $180°-\beta$, the circuitry calculates the gravity direction in the ball coordinate system, by using the geomagnetism vector detected by the magnetic sensor, the acceleration vector detected by the acceleration sensor, the magnetic dip, the traveling angle $\beta$, and the moving bearing.

4. The ball rotational direction detecting system according to claim 1, wherein the circuitry is further configured to:
calculate the moving bearing by using the geomagnetism vector detected by the magnetic sensor, in a state where the ball includes on a surface of the ball a first specific region and a second specific region pointing in directions orthogonal to each other, and the ball is brought to a standstill with the first specific region and the second specific region pointing in the moving bearing and a vertically upward direction, respectively, wherein the moving bearing is recorded in the circuitry.

5. The ball rotational direction detecting system according to claim 1, wherein the circuitry is further configured to:
calculate the magnetic dip by using the acceleration vector detected by the acceleration sensor and the geomagnetism vector detected by the magnetic sensor, in a state where the ball is brought to a standstill, wherein
the magnetic dip is recorded in the circuitry.

6. The ball rotational direction detecting system according to claim 1, wherein the circuitry is further configured to calculate a first rotational speed of an earth coordinate system in the ball coordinate system by using the first time variation in the geomagnetism vector detected by the magnetic sensor, and to calculate a second rotational speed of the ball by using the calculated rotational speed of the earth coordinate system in the ball coordinate system.

7. The ball rotational direction detecting system according to claim 1, further comprising:
an impact acceleration sensor that is fixed in the ball and detects an impact acceleration at least in one axis direction, the impact acceleration having a magnitude greater than a magnitude of the acceleration vector detected by the acceleration sensor,
wherein the circuitry is further configured to determine by using the impact acceleration detected by the impact acceleration sensor, a time point at which a midair movement of the ball stops.

8. The ball rotational direction detecting system according to claim 7, wherein the impact acceleration sensor has a lower detection sensitivity than the acceleration sensor and has a wider detection range than the acceleration sensor.

9. The ball rotational direction detecting system according to claim 7, wherein the impact acceleration sensor measures the impact acceleration in three axis directions orthogonal to one another.

10. The ball rotational direction detecting system according to claim 7, wherein the circuitry is further configured to determine, by using the impact acceleration detected by the impact acceleration sensor, a time point at which the midair movement of the ball starts.

11. The ball rotational direction detecting system according to claim 1, wherein an acceleration vector at a time when the ball having been thrown is caught, is detected as a catching-time acceleration vector, and the traveling direction in the ball coordinate system is calculated by using the catching-time acceleration vector.

12. The ball rotational direction detecting system according to claim 11, wherein the traveling direction in the ball coordinate system at each time point in a period during which the ball is in midair, is calculated by using the catching-time acceleration vector and a plurality of geomagnetism vectors that are consecutively obtained while the ball is in midair.

13. The ball rotational direction detecting system according to claim 1, wherein the magnetic sensor includes at least one sensor element with an amorphous wire.

14. The ball rotational direction detecting system according to claim 13, wherein the magnetic sensor includes three of the at least one sensor element, the three of the at least one sensor element disposed such that the respective amorphous wires are orthogonal to one another.

15. The ball rotational direction detecting system according to claim 14, wherein each of the three of the at least one sensor element includes a base and a detecting coil, an amorphous wire fixed to the base, the detecting coil wound around the amorphous wire.

16. The ball rotational direction detecting system according to claim 15, wherein the base is formed of a non-magnetic substance.

17. The ball rotational direction detecting system according to claim 1, wherein the circuitry specifies so as to select arbitrarily one of the two vectors as the vector in the gravity direction in the ball coordinate system in a third case where the moving bearing does not include the westward vector component and the eastward vector component.

* * * * *